US006909874B2

(12) United States Patent
Holtz et al.

(10) Patent No.: US 6,909,874 B2
(45) Date of Patent: Jun. 21, 2005

(54) INTERACTIVE TUTORIAL METHOD, SYSTEM, AND COMPUTER PROGRAM PRODUCT FOR REAL TIME MEDIA PRODUCTION

(75) Inventors: Alex Holtz, Jacksonville, FL (US); William H. Couch, Fernandina Beach, FL (US); Robert J. Snyder, Jacksonville, FL (US)

(73) Assignee: Thomson Licensing SA., Boulogne Cedex (FR)

(*) Notice: Subject to any disclaimer, the term of this patent is extended or adjusted under 35 U.S.C. 154(b) by 25 days.

(21) Appl. No.: 09/832,923

(22) Filed: Apr. 12, 2001

(65) Prior Publication Data

US 2002/0031756 A1 Mar. 14, 2002

Related U.S. Application Data

(60) Provisional application No. 60/196,471, filed on Apr. 12, 2000.

(51) Int. Cl.$^7$ .................................................. G09B 7/00
(52) U.S. Cl. ....................... 434/362; 434/350; 434/323; 434/322; 434/365
(58) Field of Search ............................... 434/362, 350, 434/323, 322, 307 R

(56) References Cited

U.S. PATENT DOCUMENTS

| | | | |
|---|---|---|---|
| 4,232,311 A | 11/1980 | Agneta | |
| 4,242,707 A | 12/1980 | Budai | |
| 4,272,790 A | 6/1981 | Bates | |

(Continued)

FOREIGN PATENT DOCUMENTS

| | | | | |
|---|---|---|---|---|
| EP | 0 239 884 A1 | 10/1987 | ............ | G09B/5/06 |
| EP | 0 239 884 B1 | 9/1993 | ............ | G09B/5/06 |
| EP | 0 774 756 A2 | 5/1997 | ......... | G11B/27/034 |

(Continued)

OTHER PUBLICATIONS

Burghardt, J., "Das Sony–News–System," *Fernseh Und Kinotechnik*, vol. 50, No. 11, pp. 641–642 and 644–646 (Berlin, Vde Verlag Gmbh, Nov. 1, 1996).

English–language translation of Sections 1 and 2 of Burghardt, J., "Das Sony–News–System," *Fernseh Und Kinotechnik*, 3 Pages (Berlin, Vde Verlag Gmbh, Nov. 1, 1996).

*Avstar and ParkerVision Streamline Broadcast News Production Process: Reducing Costs*, Radio–Television News Directors Association Sep. 29, 1999 [retrieved Oct. 2, 1999], at http://www.avstarnews.com/news/parker.html, 3 pages.

(Continued)

*Primary Examiner*—Derris H. Banks
*Assistant Examiner*—John Sotomayor
(74) *Attorney, Agent, or Firm*—Joseph S. Tripoli; Harvey D. Fried; Robert B. Levy

(57) ABSTRACT

A tutorial system and method is provided to send online media production lessons and other data to one or more students over a computer network, such as the global Internet or an organization's intranet. A tutorial management server communicates with a plurality of student workstations, instructor workstations and integrated, fully automated media production systems. The tutorial management server includes a matriculation manager that registers and maintains system security. A curriculum manager controls the routing of lesson contents to each student. Tutorial management server also includes devices that evaluates each student's proficiency and performance and creates a study guide to assist the student in improving overall performance. A messaging manager is provided to support real time communications among the students and their instructors. In an embodiment, the tutorial management server guides the student in generating a script or broadcast instructions to pre-produce a live or live-to-tape media production.

43 Claims, 18 Drawing Sheets

U.S. PATENT DOCUMENTS

| | | |
|---|---|---|
| 4,283,766 A | 8/1981 | Snyder et al. |
| 4,400,697 A | 8/1983 | Currie et al. |
| 4,488,180 A | 12/1984 | Rabinowitz |
| 4,559,531 A | 12/1985 | Buynak |
| 4,631,590 A | 12/1986 | Yamada et al. |
| 4,689,683 A | 8/1987 | Efron |
| 4,746,994 A | 5/1988 | Ettlinger |
| 4,768,102 A | 8/1988 | O'Gwynn |
| 4,972,274 A | 11/1990 | Becker et al. |
| 4,982,346 A | 1/1991 | Girouard et al. |
| 5,001,473 A | 3/1991 | Ritter et al. |
| 5,036,395 A | 7/1991 | Reimers |
| 5,115,310 A | 5/1992 | Takano et al. |
| 5,148,154 A | 9/1992 | MacKay et al. |
| 5,166,797 A | 11/1992 | Angell |
| 5,189,516 A | 2/1993 | Angell |
| 5,231,499 A | 7/1993 | Trytko |
| 5,237,648 A | 8/1993 | Mills et al. |
| 5,262,865 A | 11/1993 | Herz |
| 5,274,758 A | 12/1993 | Beitel et al. |
| 5,307,456 A | 4/1994 | MacKay |
| 5,388,197 A | 2/1995 | Rayner |
| 5,420,724 A | 5/1995 | Kawamura et al. |
| 5,434,678 A | 7/1995 | Abecassis |
| 5,442,749 A | 8/1995 | Northcutt et al. |
| 5,450,140 A | 9/1995 | Washino |
| 5,487,167 A | 1/1996 | Dinallo et al. |
| 5,519,828 A | 5/1996 | Rayner |
| 5,537,157 A | 7/1996 | Washino et al. |
| 5,557,724 A | 9/1996 | Sampat et al. |
| 5,559,641 A | 9/1996 | Kajimoto et al. |
| 5,565,929 A | 10/1996 | Tanaka |
| 5,577,190 A * | 11/1996 | Peters ........................ 345/501 |
| 5,602,684 A | 2/1997 | Corbitt et al. |
| 5,625,570 A | 4/1997 | Vizireanu et al. |
| 5,659,792 A | 8/1997 | Walmsley |
| 5,659,793 A | 8/1997 | Escobar et al. |
| 5,664,087 A | 9/1997 | Tani et al. |
| 5,680,639 A | 10/1997 | Milne et al. |
| 5,682,326 A | 10/1997 | Klingler et al. |
| 5,724,521 A | 3/1998 | Dedrick |
| 5,737,011 A | 4/1998 | Lukacs |
| 5,740,549 A | 4/1998 | Reilly et al. |
| 5,752,238 A | 5/1998 | Dedrick |
| 5,761,417 A | 6/1998 | Henley et al. |
| 5,764,306 A | 6/1998 | Steffano |
| 5,774,664 A | 6/1998 | Hidary et al. |
| 5,778,181 A | 7/1998 | Hidary et al. |
| 5,790,117 A * | 8/1998 | Halviatti et al. ............ 345/744 |
| 5,805,154 A | 9/1998 | Brown |
| 5,826,102 A | 10/1998 | Escobar et al. |
| 5,833,468 A | 11/1998 | Guy et al. |
| 5,852,435 A | 12/1998 | Vigneaux et al. |
| 5,872,565 A | 2/1999 | Greaves et al. |
| 5,875,108 A * | 2/1999 | Hoffberg et al. .............. 700/17 |
| 5,880,792 A | 3/1999 | Ward et al. |
| 5,892,507 A | 4/1999 | Moorby et al. |
| 5,892,767 A | 4/1999 | Bell et al. |
| 5,918,002 A | 6/1999 | Klemets et al. |
| 5,930,446 A | 7/1999 | Kanda |
| 5,931,901 A | 8/1999 | Wolfe et al. |
| 5,987,501 A | 11/1999 | Hamilton et al. |
| 5,999,912 A | 12/1999 | Wodarz et al. |
| 6,006,241 A | 12/1999 | Purnaveja et al. |
| 6,011,537 A | 1/2000 | Slotznick |
| 6,018,768 A | 1/2000 | Ullman et al. |
| 6,026,368 A | 2/2000 | Brown et al. |
| 6,029,045 A | 2/2000 | Picco et al. |
| 6,038,573 A | 3/2000 | Parks |
| 6,064,967 A | 5/2000 | Speicher |
| 6,084,581 A | 7/2000 | Hunt |
| 6,084,628 A | 7/2000 | Sawyer |
| 6,119,098 A | 9/2000 | Guyot et al. |
| 6,133,309 A | 10/2000 | Bollag et al. |
| 6,134,380 A | 10/2000 | Kushizaki |
| 6,141,007 A | 10/2000 | Lebling et al. |
| 6,146,148 A * | 11/2000 | Stuppy ........................ 434/322 |
| 6,157,929 A | 12/2000 | Zamiska et al. |
| 6,160,570 A | 12/2000 | Sitnik |
| 6,182,050 B1 | 1/2001 | Ballard |
| 6,188,396 B1 | 2/2001 | Boezeman et al. |
| 6,198,477 B1 | 3/2001 | Kurtze et al. |
| 6,198,906 B1 | 3/2001 | Boetje et al. |
| 6,204,840 B1 | 3/2001 | Petelycky et al. |
| 6,211,869 B1 | 4/2001 | Loveman et al. |
| 6,216,112 B1 | 4/2001 | Fuller et al. |
| 6,223,211 B1 | 4/2001 | Hamilton et al. |
| RE37,342 E | 8/2001 | Washino et al. |
| 6,315,572 B1 * | 11/2001 | Owens et al. ................ 434/118 |
| 6,404,978 B1 | 6/2002 | Abe |
| 6,437,802 B1 | 8/2002 | Kenny |
| 6,441,832 B1 | 8/2002 | Tao et al. |
| 6,442,529 B1 | 8/2002 | Krishan et al. |
| 6,452,612 B1 | 9/2002 | Holtz et al. |
| 6,469,711 B2 | 10/2002 | Foreman et al. |
| 2002/0170068 A1 | 11/2002 | Rafey et al. |
| 2003/0206720 A1 | 11/2003 | Abecassis |

FOREIGN PATENT DOCUMENTS

| | | | |
|---|---|---|---|
| EP | 0 774 756 A3 | 5/1997 | ......... G11B/27/034 |
| EP | 0 817 474 A1 | 1/1998 | .......... H04N/5/222 |
| EP | 0 933 893 A1 | 8/1999 | ............ H04H/7/00 |
| GB | 2 323 699 A | 9/1998 | ............ H04N/5/78 |
| WO | WO 87/07108 | 11/1987 | .......... H04N/5/782 |
| WO | WO 98/45789 A1 | 10/1998 | ............ G06F/17/21 |
| WO | WO 98/45792 A1 | 10/1998 | ............ G06F/17/30 |
| WO | WO 99/05821 A2 | 2/1999 | ............ H04L/12/00 |
| WO | WO 99/05821 A3 | 2/1999 | ............ H04L/12/00 |

OTHER PUBLICATIONS

*Avstar BCS*, at http://www.avstarnews.com/products/bcs/bcs_over.html, 2 pages (last visited Oct. 2, 1999).

*Avstar Fact Sheet*, at http://www.avstarnews.com/about/facts.html, 2 pages(last visited Oct. 2, 1999).

*Avstar MBS*, at http://www.avstarnews.com/products/mbs/mbs_over html, 1 page (last visited Oct. 2, 1999).

*Avstar Products*, at http://www.avstarnews.com/products/products.html, 1 page (last visited Oct. 2, 1999).

*Avstar™ Broadcast Control System*, available at http://www.avstarnews.com/products/bcs/bcs_over.html, 2 pages (last visited Oct. 2, 1999).

*Avstar™ Media Browse System*, available at http://www.avstarnews .com/products/mbs/mbs_over.html, 2 pages (last visited Oct. 2, 1999).

*Avstar™ Newsroom Computer System*, available at http://www.avstarnews.com/products/ncs/ncs_over.html 2 pages (last visited Oct. 2, 1999).

*Complete Seamless Integration*, at http://www.play.com/trinityNLE/complete.html, 2 pages (last visited Oct. 14, 1999).

*Edit. Sweet.*, at http://www.play.com/trinityNLE/edit.html (last visited Oct. 14, 1999).

*Gizmos98 Home Page*, at http://www.play.com/products/gizmos/index.html, 2 pages (last visited Oct. 15, 1999).

*GlobalCast Communications, Inc.—Solutions*, GlobalCast Communications, at http://www.gcast.com/solutions.shtml, 2 pages (last visited Ocotber 15, 1999).

*GlobeCaster*, at http://www.play.com/products/globecaster/index.html 2 pages (last visited Oct. 14, 1999).
*HP Teams With ISVs To Complete Solution Portfolio for Internet Service Providers*, GlobalCast Communications, Sep. 28, 1998 [retrieved on Oct. 15, 1999] at http://www.g-cast.com/press/11.shtml, 2 pages.
*LeaderPlus*, at http://www.avstarnews.com/products/leader/leader_over.html, 2 pages (last visited Oct. 2, 1999).
*Lucent Technologies and GlobalCast Communications Form Strategic Partnership in Reliable Multicast Market*, GlobalCast Communications, Aug. 25, 1997 [retrieved on Oct. 15, 1999] at http://www.gcast.com/press/2.shtml, 2 pages.
*Newsroom Computer System*, at http://www.avstarnews.com/products/ncs/ncs_over.html, 2 pages (last visited Oct. 2, 1999).
*Play Incorporated Announces Do–It–Yourself Internet Studio*, Nov. 19, 1998 [retrieved Oct. 15, 1999] at http://www.play.com/news/111698–globecaster.html, 2 pages.
*Play Incorporated Announces Trinity Live, A Live Production System Based on Advanced Digital Component Switcher and Real–Time Trinity Architecture*, Sep. 10, 1999 [retrieved on Oct. 15, 1999] at http://www.play.com/news/091099.html, 2 pages.
*Product Features*, at http://www.play.com/products/globecaster/features.html, 1 page (last visited Oct. 15, 1999).
*Products*, at http://www.play.com/products/index.html, 2 pages (last visited Oct. 14, 1999).
*Products: Trinity*, at http://www.play.com/products/trinity/index/html, 1 page (last visited Oct. 14, 1999).
*Products: Trinity: Digital Effects*, at http://www.play.com/products/trinity/digital.html, 2 pages (last visited Oct. 14, 1999).
*Products: Trinity: Editor*, at http://www.play.com/products/trinity/editor.html, 1 page (last visited Oct. 14,1999).
*Products: Trinity: Switcher*, at http://www.play.com/products/trinity/switcher.html, 2 pages (last visited Oct. 14, 1999).
*Products: Trinity: Technical Specifications*, at http://www.play.com/products/trinity/techspecs.html, 1 page (last visited Oct. 14, 1999).
*RealProducer Plus G2*, at http://www.real.com/products/tools/producerplus/index.html, 3 pages (last visited Oct. 15, 1999).
*RealProducer Plus G2 Documentation*, at http://www.real.com/products/tools/producerplus/docs.html, 3 pages (last visited Oct. 15, 1999).
*System Requirements*, at http://www.play.com/products/globecaster/sysreg.html, 1 page (last visited Oct. 15. 1999).
*Technical Engineer Speak Specs*, at http://www.play.com/trinityNLE/tech.html, 2 pages (last visited Oct. 14, 1999).
*Trinity NLE Is Here!*, Oct. 4, 1999 [retrieved at Oct. 15, 1999] http://www.play.com/news/100499.html, 2 pages.
*Trinity University Opens*, Dec. 17, 1997 [retrieved Oct. 15, 1999] at http://wwww.play.com/news/121797.html, 1 page.
*Video Production*, at http://www.winningpost.com.au/html/video_production.html, 1 page (last visited Oct. 14, 1999).
Wolfe, M., *Television Stations, Production Companies Appreciate Trinity's Impressive Features, Low Cost*, Sep. 2, 1999 [retrieved on Oct. 15, 1999] at http://www.play.com/news/090299.html, 2 pages.
Wolfe, M., *USA Today Runs Extensive Story About Globe-Caster*, Jun. 16, 1999 [retrieved on Oct. 15, 1999] at http://www.play.com/news/061699.html, 2 pages.

Copy of International Search Report for Appl. No. PCT/US01/00547 issued Aug. 28, 2001, 10 Pages.
Copy of International Search Report for Appl. No. PCT/US01/10306 issued Jan. 18, 2002, 6 Pages.
*ADC–100*, [retrieved on Jul. 13, 1998] at http://www.louth.com/products/adc100_info.htm, 2 pages.
Ahanger, G. and Little, T., "Automatic Composition Techniques for Video Production," *IEEE Transactions on Knowledge and Data Engineering*, IEEE, vol. 10, No. 6, Nov./Dec. 1998, pp. 967–987.
*AirBoss: Airtime Broadcast Automation*, [retrieved on Jul. 13, 1998] at http://www.florical.com/airboss.html, 1 pages.
*CameraMan Studio*, CSS–2000–N/P, ParkerVision, Apr. 1997, 2 pages.
*CameraMan Studio System II Broadcast Production Systems*, CSS–2000, CSS–2313, CSS–2017, ParkerVision, Oct. 1997, 2 pages.
Declaration of Alex Holtz under 35 U.S.C. § 1.56, Feb. 2, 2001, 6 pages.
Hartford, S., "Overcoming Current Limitations of Personal Computers in Replacing Traditional Video Production Equipment," *SMPTE Journal*, Jan. 1998, pp. 58–64.
Judy, T.A. (Ed.), "AUTOSAT Provides Downlink Control for WKYC," *LOUTH Automation Quarterly News*, vol. 1, Issue 2, Jul., 1997, 4 pages.
Cataldo, C., "Louth Provides The Automation Solution For HBO, New York," *LOUTH Automation Quarterly News*, vol. 1, Issue 3, Oct. 1997, 4 pages.
Judy, T.A. (Ed.), "Louth Provides Satellite Program Acquisition System to CNBC–TV, New Jersey," *LOUTH Automation Quarterly News*, vol. 1, Issue 4, Jan., 1998, 4 pages.
Judy, T.A. (Ed.), "Louth Provides, Fully Digital Solution For Foxtel, Australia," *LOUTH Automation Quarterly News*, vol. 1, Issue 5, Mar., 1998, 4 pages.
Judy, T.A. (Ed.), "Telemadrid Chooses Louth For Multi–Channel Automation System," *LOUTH Automation Quarterly News*, vol. 1, Issue 6, Jul., 1998, 4 pages.
Maar, J., "Newscast Without A Crew," Television Broadcast, Oct. 1998, 1 page.
*NewsRepeater: Automated News Channel*, [retrieved on Jul. 13, 1998] at http://www.florical.com/newsrepeater.html, 1 page.
ParkerVision Beta License Agreemnt for CamerMan STUDIO Systems, ParkerVision, Dec. 19, 1997.
*Presentation Automation, The Powerful and Flexible Windows Based Solution* (Copyright 1995, 1996), [retrieved on Jul. 14, 1998] at http://www.pro–bel.com/corporate/-pro–bel_software/products/automation/cp–4000.htm „ 3 pages.
*Pro–Bel Software: Procion AV–Workbench* (Copyright 1995–1998), [retrieved on Jul. 14, 1998] at http://www.pro–bel.com/corporate/pro–bel.1td/products/ShortForm/page3.htm, 8 pages.
*Product Information* (last revised Jun. 17, 1998), [retrieved on Jul. 13, 1998] at http://www.louth.com/products/index.htm, 1 page.
*Products: Integrated Money Making Systems*, at http://www.florical.com/products.html, 2 pages (last visited Jul. 13, 1998).
*ShowTimer: PreAir Automation*, at http://www.florical.com/showtimer.html, 1 page (last visited Jul. 13, 1998).
Slack, P.A. et al., "An Integrated Video Production System," *International Broadcasting Convention*, Sep. 12–16, 1996, pp. 403–408.

*SpotCacher–Video Server and Cache Management*, at http://www.florical.com/spotcacher.html, 1 page (last visited Jul. 13, 1998).

*Station Automation—Now It's A Snap!* (Copyright 1995, 1996), Pro–Bel Ltd., at http://www.pro–bel.com/corporate/pro–bel_software/products/automation, 2 pages (last visited Jul. 14, 1998).

*TimeShifter: Tape/Disk Network Delay*, at http://www.florical.com/timeshifter.html, 1 page (last visited Jul. 13, 1998).

*Video Server Management System* (Copyright 1995, 1996), Pro–Bel Ltd., at http://www.pro–bel.com/corporate/pro–bel_software/products/mapp /, 4 pages (last visited Jul. 14, 1998.

Vigneaux, S., "The Integration of a Newsroom Computer System with a Server–Centred News Production System," *International Broadcasting Convention*, Sep. 12–16, 1996, pp. 512–518.

English–language Abstract of JP 10–065936, published Mar. 6, 1998, from http://www1.ipd1.jpo.go.jp/PA1/result/detail/main/wAAAa10517DA410065936P1.htm, 2 Pages (last visited May 20, 2002).

"About Yahoo! Broadcast," *Yahoo!® Broadcast* [online], 2000 [retrieved on Apr. 26, 2001]. Retrieved from the Internet:<URL: http://business.broadcast.com/about_2.html, 1 page.

"Advantages," *Yahoo!® Broadcast* [online], 2000 [retrieved on Apr. 26, 2001]. Retrieved from the Internet:<URL: http://business.broadcast.com/advantages.html, 3 pages.

"Content and Conversation," *Yahoo!® Broadcast* [online], [retrieved on Apr. 26, 2001]. Retrieved from the Internet:<URL: http:business.broadcast.com/sanders_sprint/frameset/html, 1 page.

U.S. Appl. No. 10/431,576, filed May 8, 2003, Snyder et al.
U.S. Appl. No. 10/247,783, filed Sep. 20, 2002, Holtz et al.
U.S. Appl. No. 10/434,458, filed May 9, 2003, Snyder et al.
U.S. Appl. No. 10/434,461, filed May 9, 2003, Holtz et al.
U.S. Appl. No. 10/208,810, filed Aug. 1, 2002, Holtz et al.
U.S. Appl. No. 10/434,460, filed May 9, 2003, Snyder et al.

Festa, P., "Flood of spending due for streaming video," *Yahoo!® News* [online], Apr. 12, 2001 [retrieved Apr. 26, 2001]. Retrieved from the Internet:<URL: http://dailynews.yahoo.com/h/cn/20010412/tc/flood_of_spending_due_for_streaming_video_1.html, 2 pages.

Mannes, G., "Yahoo! Joins Suddenly Crowded Online Music Field," *AOL Personal Finance* [online], Apr. 5, 2001 [retrieved Apr. 26, 2001]. Retrieved from the Internet:<URL: http://aol.thestreet.com/tech/internet/1379000.html, 3 pages.

Mannes, G., "Chasing Sweet Semel of Success Takes Yahoo! To Hollywood," *AOL Personal Finance* [online], Apr. 17, 2001 [retrieved Apr. 26, 2001]. Retrieved from the Internet:<URL: http://aol.thestreet.com/tech/internet/1393298.html, 3 pages.

"Overview," *Yahoo!® Broadcast* [online], 2000 [retrieved Apr. 26, 2001]. Retrieved from the Internet:<URL: http://business/broadcast.com/overview.html, 2 pages.

Weisman, R., "Yahoo's Latest: New Broadcast Site," *Yahoo!® News* [online], Apr. 23, 2001 [retrieved Apr. 26, 2001]. Retrieved from the Internet:<URL: http://dailynews.yahoo.com/h/nf/20010423/tc/9176_1.html, 3 pages.

"Webcasting 101," *Yahoo!® Broadcast* [online], 2000 [retrieved Apr. 26, 2001]. Retrieved from the Internet:<URL: http://business.broadcast.com/webcasting101.html, 3 pages.

"Welcome," *Yahoo!® Broadcast* [online], 2000, [retrieved Apr. 26, 2001]. Retrieved from the Internet:<URL: http://business.broadcast.com/, 1 page.

"Welcome to Yahoo! Broadcast," *Yahoo!® Broadcast* [online], 2001 [retrieved Apr. 26, 2001]. Retrieved from the Internet:>URL: http://mediaframe.yahoo.com/launch?Iid=wmv–56–p.902530–41362,wmv–100–p.902531–4136 . . . /index2htm, 1 page.

Wine, W., Dr., "What is I Love TV™?," *iLoveTV Inc.* [online], [retrieved Jun. 12, 2001]. Retrieved from the Internet:>URL http://209.47.14.231/whatis.html, 1 page.

Humpries, M., "The Options.," *iLoveTV Inc.* [online], [retrieved Jun. 12, 2001]. Retrieved from the Internet:>URL: http://209.47.14.231/possible1.html, 1 page.

Wine, W., Dr., "The Benefits," iLoveTV Inc. [online], [retrieved Jun. 12, 2001]. Retrieved from the Internet:>URL:http://209.47.14.231/benefit.html, 1 page.

"Contact Us," *iLoveTV Inc.* [online], [retrieved Jun. 12, 2001]. Retrieved from the Internet:>URL: http://209.47.14.231/contact.html, 1 page.

"Press Releases," *iLoveTV Inc.*[online], Jun. 5, 2001 [retrieved Jun. 12, 2001]. Retrieved from the Internet:>URL: http://209.47.14.231/press.html, 1 page.

Park, I., "I Love TV: Cutting Edge Technology Unites the Power of Television and the Internet," *iLoveTV Inc.* [online], Jun. 5, 2001 [retrieved Jun. 12, 2001]. Retrieved from the Internet:>URL: http://209.47.14.231/press_cuttingEdge.html, 2 pages.

"Yahoo to Unveil New Broadcast Site," *Yahoo!® News* [online], Apr. 23, 2001 [retrieved Apr. 26, 2001], Retrieved from the Internet:>URL: http://dailynews.yahoo.com/h/nm/20010423/tc/yahoo_broadcast_dc_1.html, 2 pages.

"Yahoo! Events," *Yahoo!® Events* [online], Apr. 26, 2001 [retrieved Apr. 26, 2001]. Retrieved from the Internet:>URL: http://events.yahoo.com/, 2 pages.

"Welcome To Yahoo! Radio," *Yahoo!® Radio* [online], [retrieved Apr. 26, 2001]. Retrieved from the Internet:>URL: http://radio.broadcast.com/, 2 pages.

Copy of International Search Report for Appln. No. PCT/US02/12048 issued Sep. 18, 2002, 6 pages.

Copy of International Search Report for Appln. No. PCT/US02/24929 issued Dec. 4, 2002, 6 pages.

Copy of International Search Report for Appln. No. PCT/US02/29647 issued Dec. 11, 2002, 1 page.

Copy of International Search Report for Appln. No. PCT/US03/14427 issued Oct. 17, 2003, 6 pages.

Copy of International Search Report for Appln. PCT/US01/00547, issued Aug. 28, 2002, 10 pages.

Copy of International Search Report for Appln. No. PCT/US01/10306, issued Jan. 18, 2002, 6 pages.

* cited by examiner

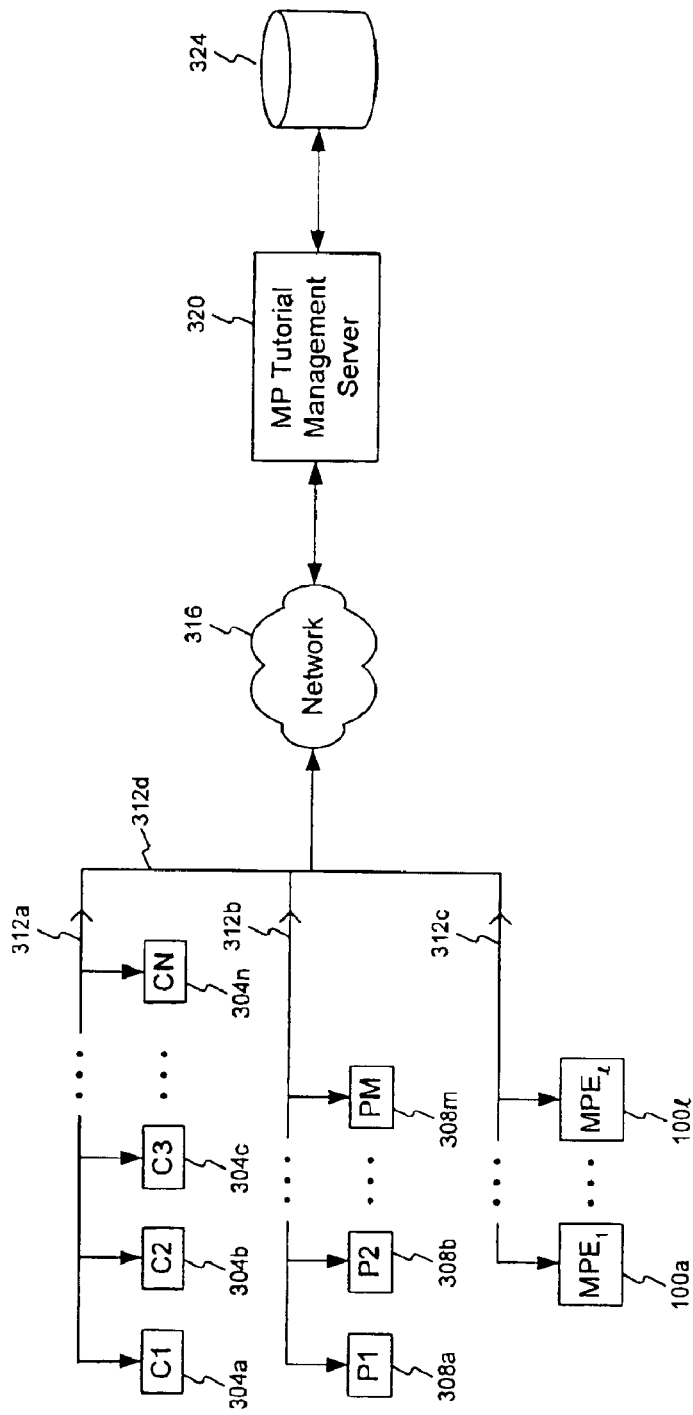
FIG. 3: Media Production Tutorial System 300

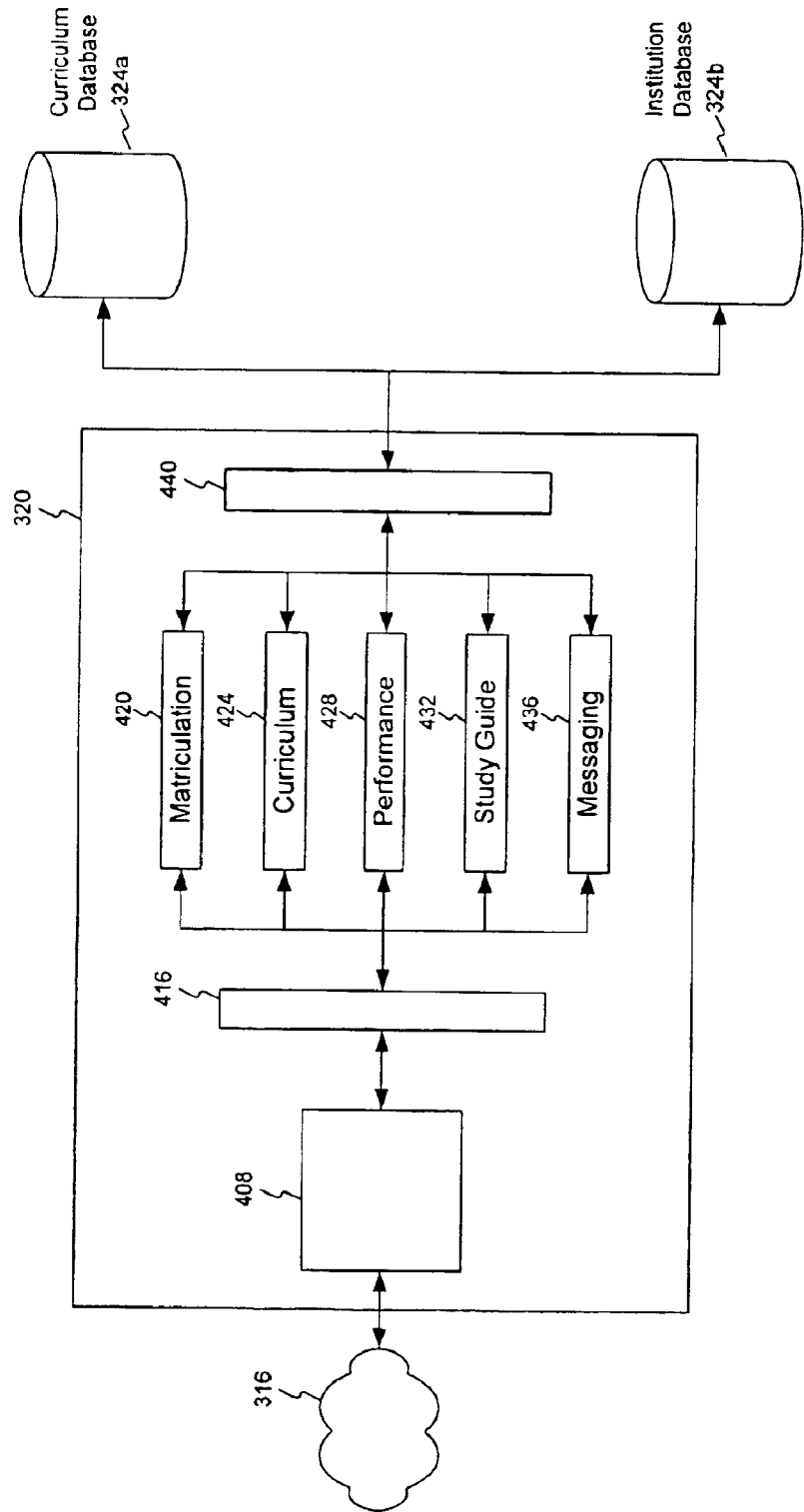
FIG. 4: Media Production Tutorial Management Server 320

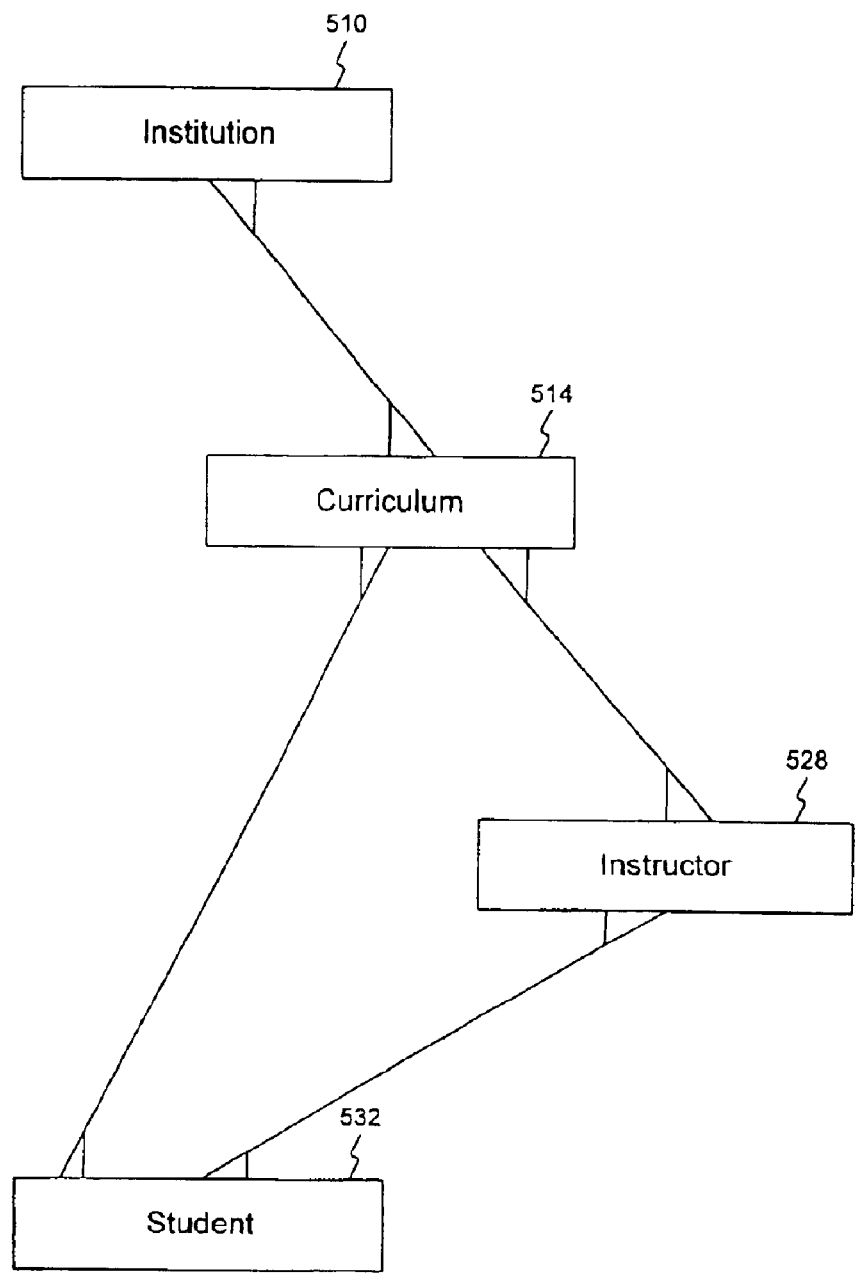
FIG. 5: Relation Diagram for Database 324

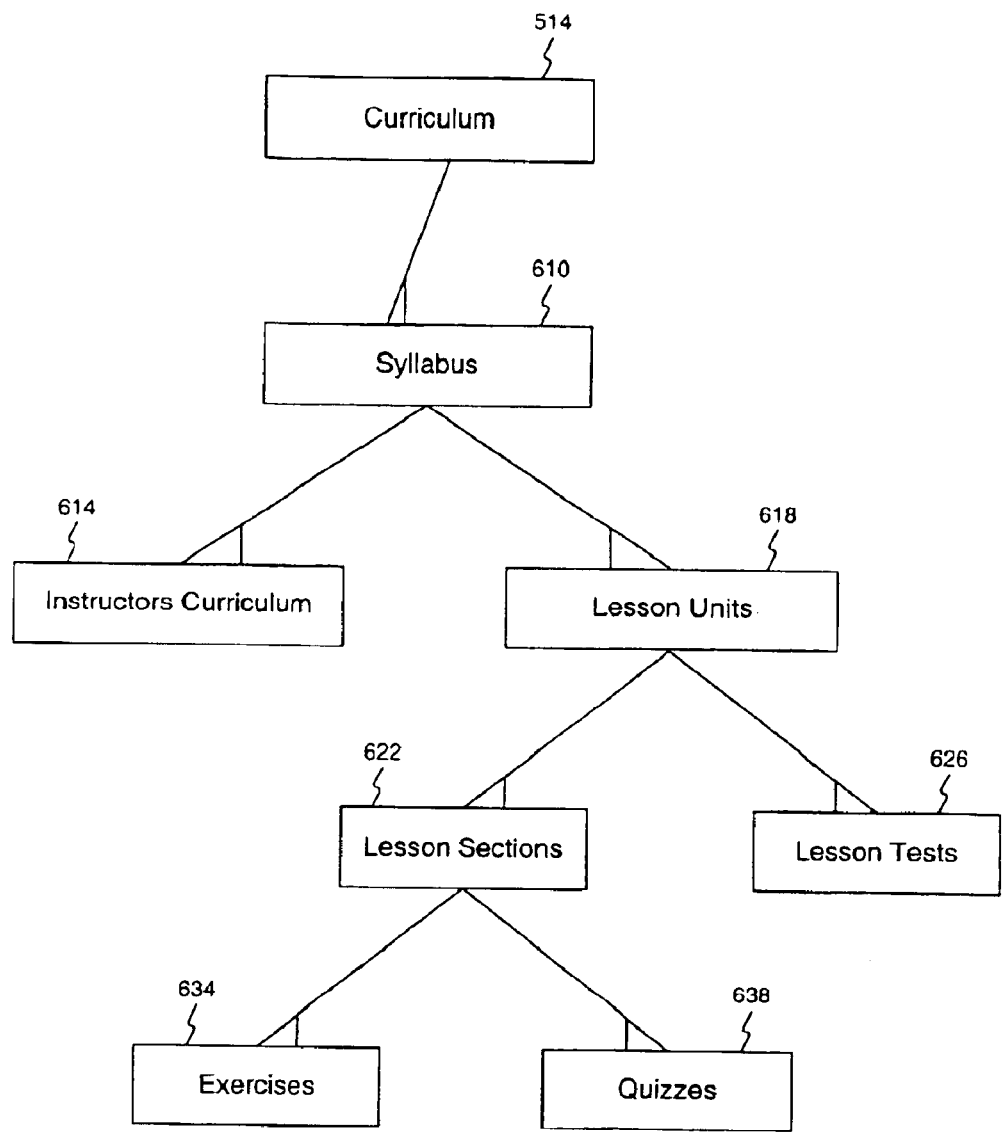
FIG. 6: Relation Diagram for Database 324a

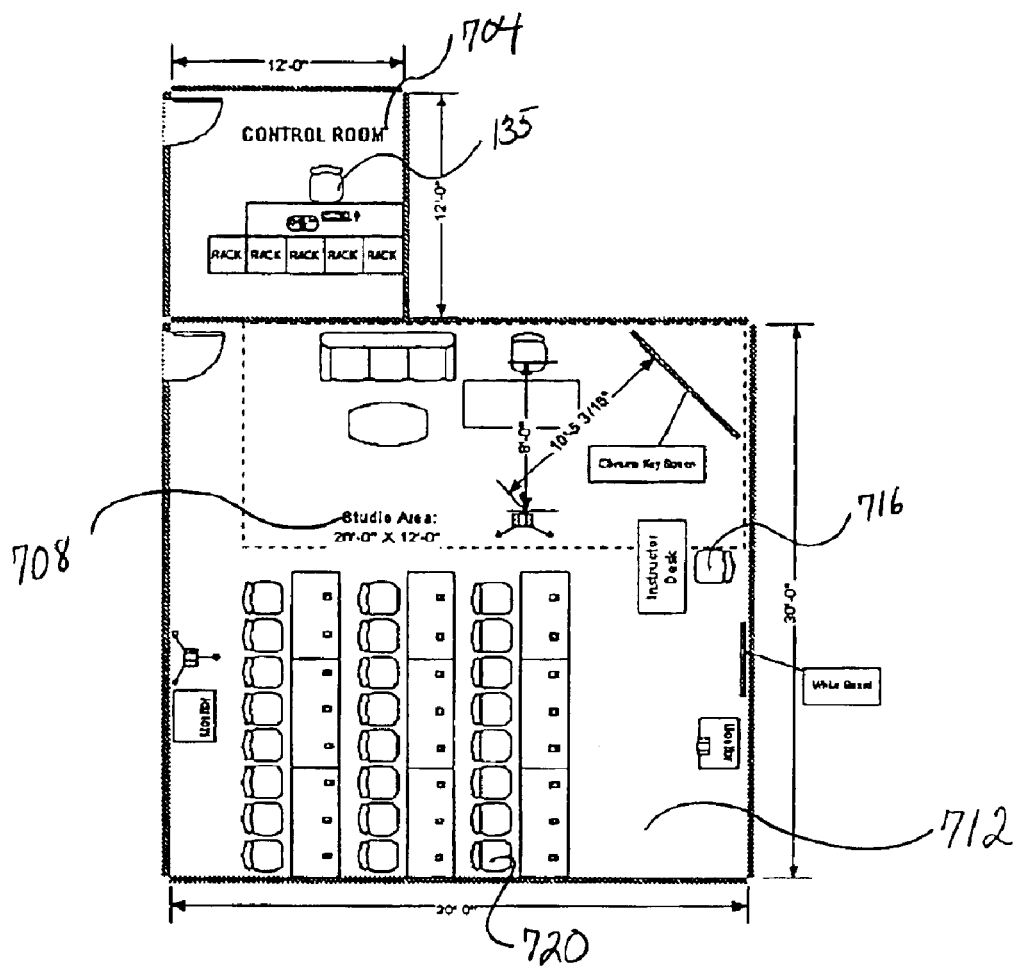
FIG. 7: Training Facility 700

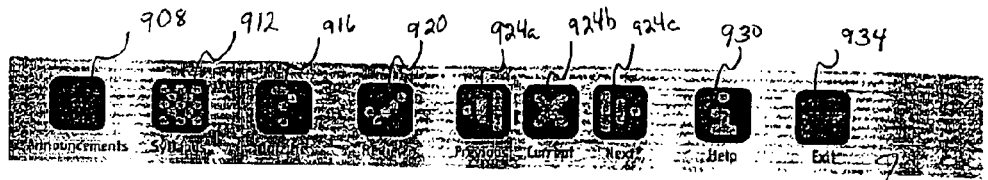

Tripods

A TRIPOD is a three-legged stand used to hold your camera steady while you pan, tilt or simply record a static shot. Tripods usually have one of two adapters that make it possible to attach a camera to them: either a quick-release shoe or a simple screw-in bolt. The best kind of tripod head is a fluid head.

Never leave a camera unattended while mounted on a tripod. If there's an emergency and you must leave the camera, designate someone to supervise it until you can return.

{ Unit 02 - Camera : Section 02 I - Basic Shots

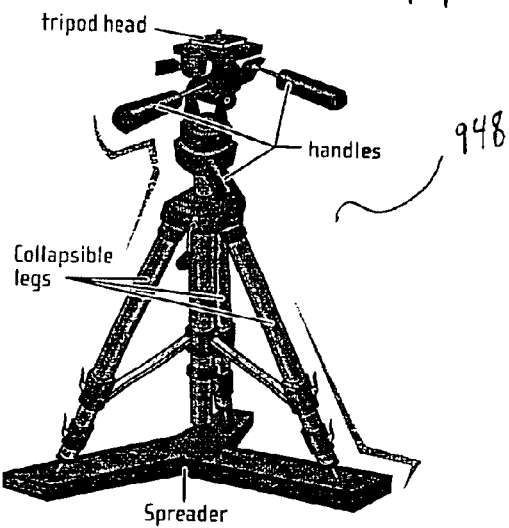

FIG. 9: GUI 900

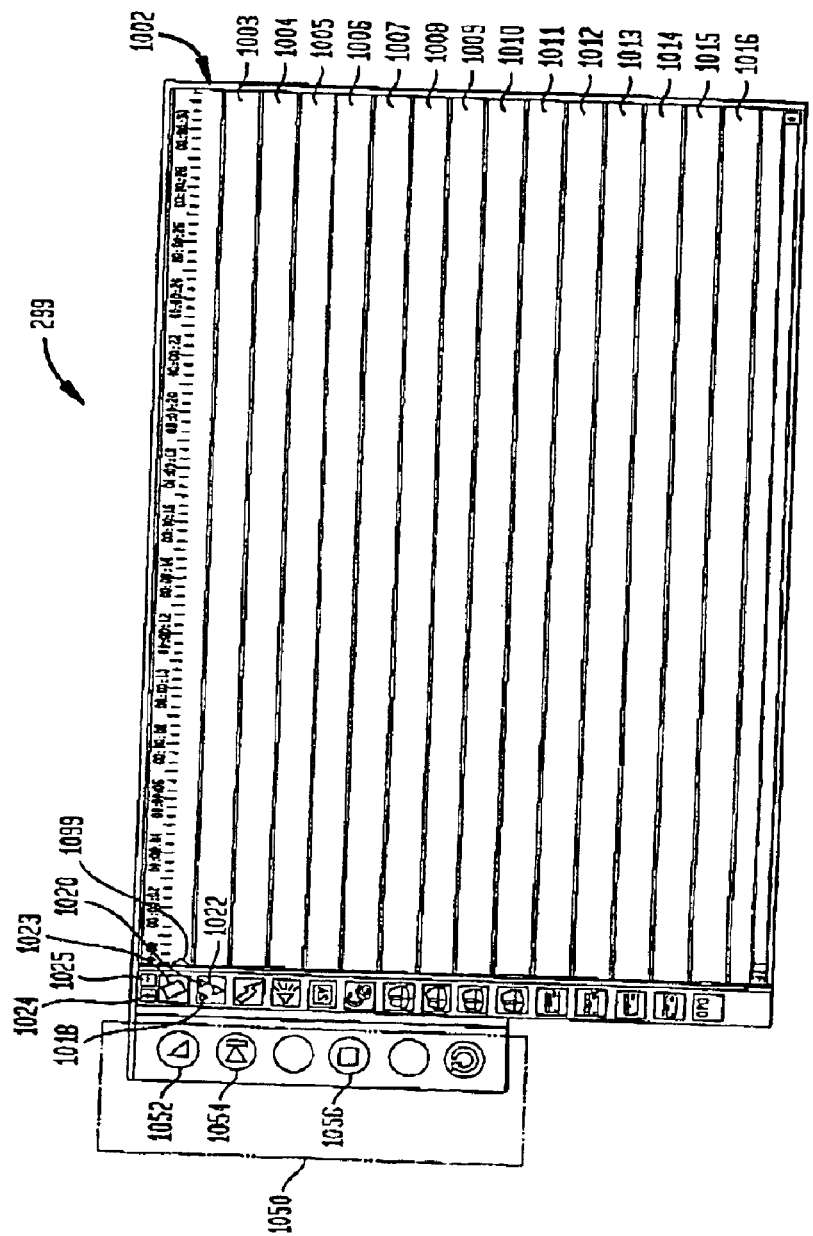

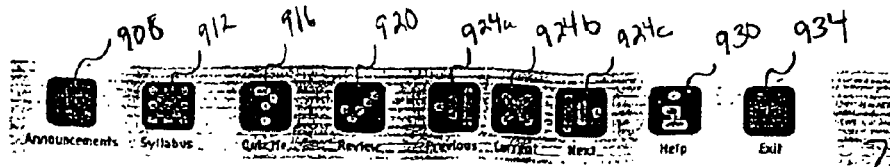

908 912 916 920 924a 924b 924c 930 934

904

Syllabus Page

☐ Unit or Lesson not visited. - ■ Unit partially complete / Lesson visited
■ Lesson tested incorrect. - ■ Unit or Lesson Completed (tested correct)

Click on a Unit to see its Sections & Lessons.    Unit 02 - Camera

☐ Unit 01 - TV History    (Click on a Lesson to go there.)

1124 ■ Unit 02 - Camera    Section 02.0 - Welcome
   ■ Welcome to the Course
☐ Unit 03 - Audio    Section 02.1 - Basic Shots ☐ Unit 04 - 3 R's    ■ Long Shots
   ☐ Medium Shots    1140
☐ Unit 05 - Editing  1144    ☐ Close-Ups
   ☐ Headroom
☐ Unit 06 - Lights    ☐ Rule of Thirds
   ☒ Tripods
☐ Unit 07 - Graphics    Section 02.2 - Camera Moves
   ☐ Pans
1120 ☐ Unit 08 - Producing & Directing    ☐ Tilt
   ☐ Dolly
☐ Unit 09 - Advertising    ☐ Trucking
   ☐ Zoom
☐ Unit 10 - Instructional Video    ☐ Lead Room
   Section 02.3 - Videotape
☐ Unit 11 - 3R's Revisited    ☐ Tape Formats
   ☐ Preparing A Tape
☐ Unit 12 - More Camera & Lighting    ☐ Tape Transport System
   ☐ Recording Speed
☐ Unit 13 - Video Technology    ☐ Tape Labels
   ☐ Tape Care
☐ Unit 14 - F/X    Section 02.5 - Shot Director
   ☐ Shot Director - Powering Up
☐ Unit 15 - More Producing & Directing    ☐ Shot Director - Focus
   ☐ Shot Director - Iris
☐ Unit 16 - Video Yearbook    ☐ Shot Director - Upper Section
   ☐ Shot Director - Lower Section
☐ Unit 17 - ABCs of EFP    ☐ Shot Director - Slide Controls
   ☐ Shot Director - Joystick Control
☐ Unit 18 - Scriptwriting    ☐ Shot Director - Joystick Zoom Control
   ☐ Studio Camera Shots
☐ Unit 19 - Documentary    Section 02.6 - Other Shots
   ☐ Camera Angle
☐ Unit 20 - That's A Wrap    ☐ Canting
   ☐ Lead The Look
   ☐ Cropping
   ☐ Backgrounds
   ☐ Over The Shoulder Shots
   Section 02.9 - Testing Lesson
   ☐ Testing Lesson
1148

FIG 11: GUI 1100

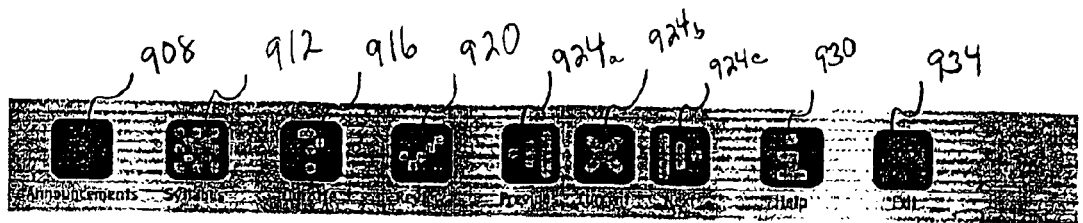
Quiz Me Page 942      904
Here is a question picked at random from the lessons you have visited but not been quizzed on, or lessons you have missed questions on.
A long shot is most often used to ____.
○ establish a setting
○ show viewers small details
○ show an entire object
1250
FIG. 12; GUI 1200

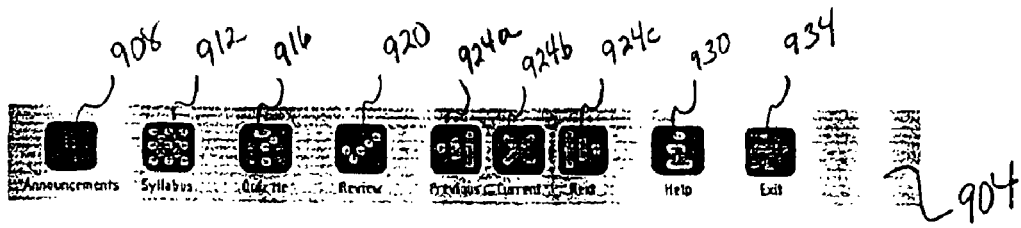

Unit 02 - Camera Test Page

Please select an answer for each of the following 33 questions and then click on the SUBMIT button a Which of the following does not describe a long shot?

- ○ It shows great detail.
- ○ It establishes a setting.
- ○ It is effective on large screen.
- ○ It is also called a wide shot.

A medium shot is best described as anything between a close-up and a long shot.

- ○ True
- ○ False

Which of the following items does not describe a close-up?

- ○ It is often cropped.
- ○ Shows great detail.
- ○ Exaggerates movement by the camera or subject.
- ○ Lacks detail.

Too little headroom makes the subject appear cramped within the frame.

- ○ False
- ○ True

The Rule of Thirds is an imaginary set of lines that go across the screen in the following pattern:

- ○ three down, three across
- ○ three down, four across
- ○ three across, four down
- ○ four across, three down

FIG. 13  GUI 1300

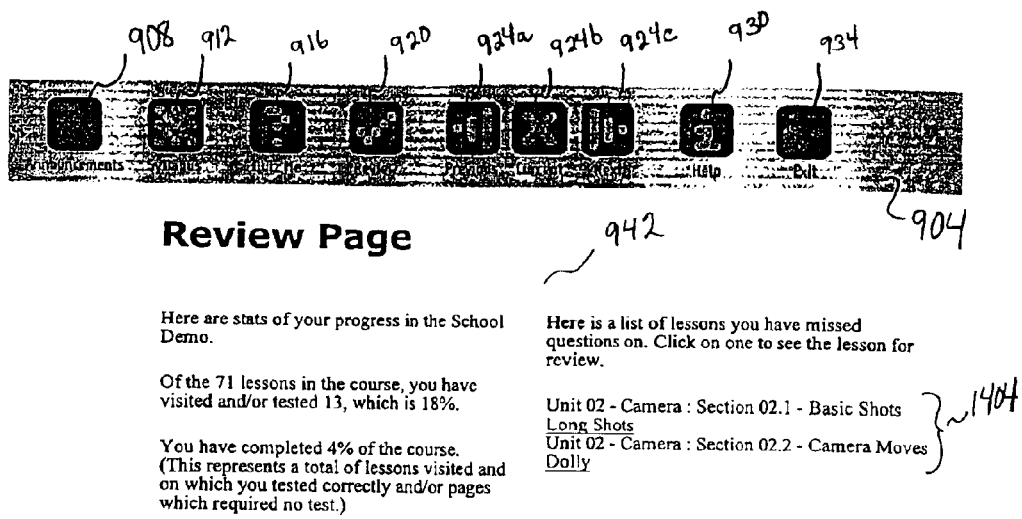
FIG. 14: GUI 1400

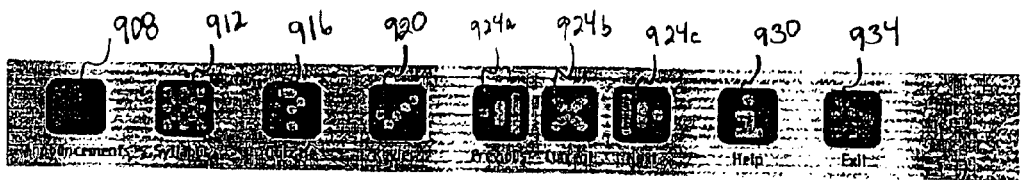
FIG. 17: GUI 1700

INTERACTIVE TUTORIAL METHOD, SYSTEM, AND COMPUTER PROGRAM PRODUCT FOR REAL TIME MEDIA PRODUCTION

CROSS-REFERENCE TO RELATED APPLICATIONS

This application claims benefit of U.S. Provisional Application Ser. No. 60/196,471, filed Apr. 12, 2000, by Holtz et al., entiled "Interactive Tutorial System, Method and Computer Program Product for Real Time Video Production, " incorporated herein by reference.

The following United States and PCT utility patent applications have a common assignee and contain some common disclosure:

"Real Time Video System and Method, " Ser. No. 09/215,161, by Holtz et al., filed Dec. 18, 1998, incorporated herein by reference;

"System and Method for Real Time Video Production and Multicasting, " Ser. No. 09/482,683, by Holtz et al., filed Jan. 14, 2000, incorporated herein by reference;

"System and Method for Real Time Video Production and Multicasting, " Ser. No. 09/488,578, by Snyder et al., filed Jan. 21, 2000, incorporated herein by reference;

"Full News Integration and Automation for a Real time Video Production System and Method," Ser. No. 60/193,452, by Holtz et al., filed Mar. 31, 2000, incorporated herein by reference;

"System and Method for Real Time Video Production and Multicasting ," Ser. No. 09/634,735, by Snyder et al., filed Aug. 8, 2000, incorporated herein by reference;

"System and Method for Real Time Video Production and Multicasting," Ser. No. PCT/US01/00547, by Snyder et al., filed Jan. 9, 2001, incorporated herein by reference;

"Method, System and Computer Program Product for Full News Integration and Automation in a Real Time Video Production Enviroment," Ser. No. 09/822,855, by Holtz et al., filed Apr. 2, 2001, incorporated herein by reference; and "Method, System and Computer Program Product for Full News Integration and Automation in a Real Time Video Production Environment, " Ser. No. PCT/US01/10306 by Holtz et al., filed Apr. 2, 2001, incorporate herein by reference.

BACKGROUND OF THE INVENTION

1. Field of the Invention

The present invention relates generally to media production, and more specifically, to a system, method and computer program product for providing educational training about live or live-to-tape media production techniques.

2. Related Art

The broadcast industry today is going through dramatic changes due to regulatory requirements for digital transmissions and competition from both traditional and nontraditional industry sectors. Traditional competitors such as cable have coexisted with broadcasters due to both mandated and agreed upon "must carry" rules that allow local broadcast stations to access cable networks. Nontraditional transmission mediums now exist due to the emergence of digital broadcast satellite (DBS) and Internet Service Providers (ISP).

As more and more households adopt nontraditional transmission mediums, the competition for consumer attention will continue to increase. Currently, the unique advantage that broadcasters have is local origination, especially from news. However, competition continues to develop for major network (i.e., ABC®, NBC® and CBS®) affiliates due to FOX®, UPN® and other startups for cable services and Internet multicasts (including webcasts). In addition, in the foreseeable future, digital transmission signals may be divided into separate channels for multicasting applications, thereby permitting major networks to step into the local origination market. In addition, newspapers, radio stations and other entities are competing for awareness and market share on the Internet. Television broadcasters are putting forth an effort to also maintain a local market share on the Internet but have yet to leverage successfully their best asset, i.e. video.

All of these issues present new obstacles that must be overcome by all broadcasters. These issues involve transitioning to digital broadcasts; leveraging automation to resolve the reallocation of resources to generate more content at lower operating expenses; creating an Internet presence to leverage their video assets; multicasting to add programming diversity and revenue; using computer networking to adapt streamlined approaches for field acquisition, pre-production, editing, and on-air execution of the show; and maintaining on-air systems through system redundancy.

One significant obstacle facing the broadcasting industry is education. Many progressive ownership groups are quickly educating their general managers, news directors and broadcast engineers about the issues outlined above. Producers and directors must also be reeducated to understand new processes and technology. Moreover, the broadcast industry must recruit new personnel well trained in new technology to remain competitive.

Consequently, educational institutions are being challenged to meet the demands of the broadcast industry for graduates well versed in digital, automation, multicasting (including, webcasting), and networking, along with work flow processes that leverage this technology. Thus, the expectation for today's students is to understand not only the artistic aspects of broadcast productions as producers and directors, but also the processes that must be implemented to leverage technology in order to successfully compete in the industry. Many of today's curriculums do not present or provide awareness for these challenges. Today's colleges and universities are limited and do not have access to nontraditional automation equipment, curriculums and teaching tools that focus on new technology.

With respect to nontraditional equipment, most schools have multistation production environments that include a separate video switcher, audio mixer, video/tape recorders (VTRs), character generators, camera control units and manually controlled cameras. Schools will be challenged to keep this equipment and train on past, present and future production techniques by purchasing a separate digital automation control room.

Regarding the school curriculums, most text books used in colleges and universities still do not cover all aspects of the digital transition and leveraging of automation for single and multichannel operations and Internet multicasting. Many cover digital fundamentals but limit the discussion to equipment without extensive workflow changes and equipment architecture that focuses on automation. In addition, many focus strictly on the postproduction non-linear aspects of digital equipment without discussing the effects on the live production process, not to mention workflow changes required to address the Internet.

As for teaching tools, standard textbook instruction limits the teacher's ability to remain updated in real time. In addition, students learn more through exposure to multimedia tools with on-demand quizzing. Nontraditional media intensive methods are needed as the industry becomes more complex and diverse and also to assist the instructor. Instructional media tools, such as CD-ROM and interactive Internet tutorials with text, video and dynamic graphic presentations, can become the standard as more students and campuses gain Internet access to the home, classroom and dormitory.

Schools are being challenged to educate students for other aspects of the broadcast production process and environment, including news automation, Internet multicasting, master control automation (i.e., scheduling programming with commercial insertions), and media management automation (i.e., video and other media server networking and technology for database management, archiving and editing).

Therefore, what is needed is a media production educational system and method that addresses the above problems.

SUMMARY OF THE INVENTION

The present invention solves the above identified problems by providing a tutorial system and method to generate and send online media production lessons and other data to one or more students over a computer network, such as an organization's private intranet or the global Internet. The lesson sessions covers, for example, all aspects of digital transition and leveraging of automation for single and multi-channel operations and Internet multicasting.

In an embodiment, a tutorial management server communicates with a plurality of student workstations, instructor workstations and integrated, fully automated media production systems. The tutorial management server includes a matriculation manager that registers and maintains system security. A curriculum manager controls the routing of lesson contents to each student. Tutorial management server also includes devices that evaluate each student's proficiency and performance and creates a study guide to assist the student in improving overall performance. A messaging manager is also provided to support real time communications among the students and their instructors.

In an embodiment, the tutorial management server guides the student in generating a script or broadcast instructions to pre-produce a live or live-to-tape media production. The broadcast instructions allows students to build a show using hot-keys that can be programmed to represent typical show segments found in producer and director rundown sheets, such as INTRO/PKG/TAG, VO, SOT, OTS and other elements or segments of a show.

Full integration with an automated media production system enables the students to have total control over multiple cameras, video switching, digital video effects, audio mixing, scripts and external devices such as VTRs, character generators and other equipment. It is important to note that the lessons and study guide can be used in a non-automated environment. In other words, the lesson plans are structured in a manner that teach both traditional methods of media production and automation methods. The automation methods can be taught without having automation equipment available for lab work although having it is a benefit to the student learning process.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

FIG. 3 illustrates a block diagram of the configuration of an embodiment of a media production tutorial system.

FIG. 4 illustrates a block diagram of the configuration of an embodiment of a media production tutorial management server.

FIG. 5 illustrates a relation diagram of the configuration of an embodiment of a media production tutorial database.

FIG. 6 illustrates a relation diagram of the configuration of an embodiment of a media production tutorial-curriculum database.

FIG. 7 illustrates an exemplary facilities layout according to an embodiment of a media production tutorial system.

FIG. 9 illustrates an embodiment for a graphical user interface for an exemplary tutorial lesson.

FIG. 10 illustrates an embodiment of timesheet 299.

FIG. 11 illustrates an embodiment for a graphical user interface for an exemplary lesson syllabus.

FIG. 12 illustrates an embodiment for a graphical user interface for an exemplary examination session for one or more lesson sections.

FIG. 13 illustrates an embodiment for a graphical user interface for an exemplary examination session for one or more lesson units.

FIG. 14 illustrates an embodiment for a graphical user interface for an exemplary study guide review page.

FIG. 17 illustrates an embodiment for a graphical user interface for an exemplary announcement page.

DETAILED DESCRIPTION OF THE INVENTION

Table of Contents

Figure 1:
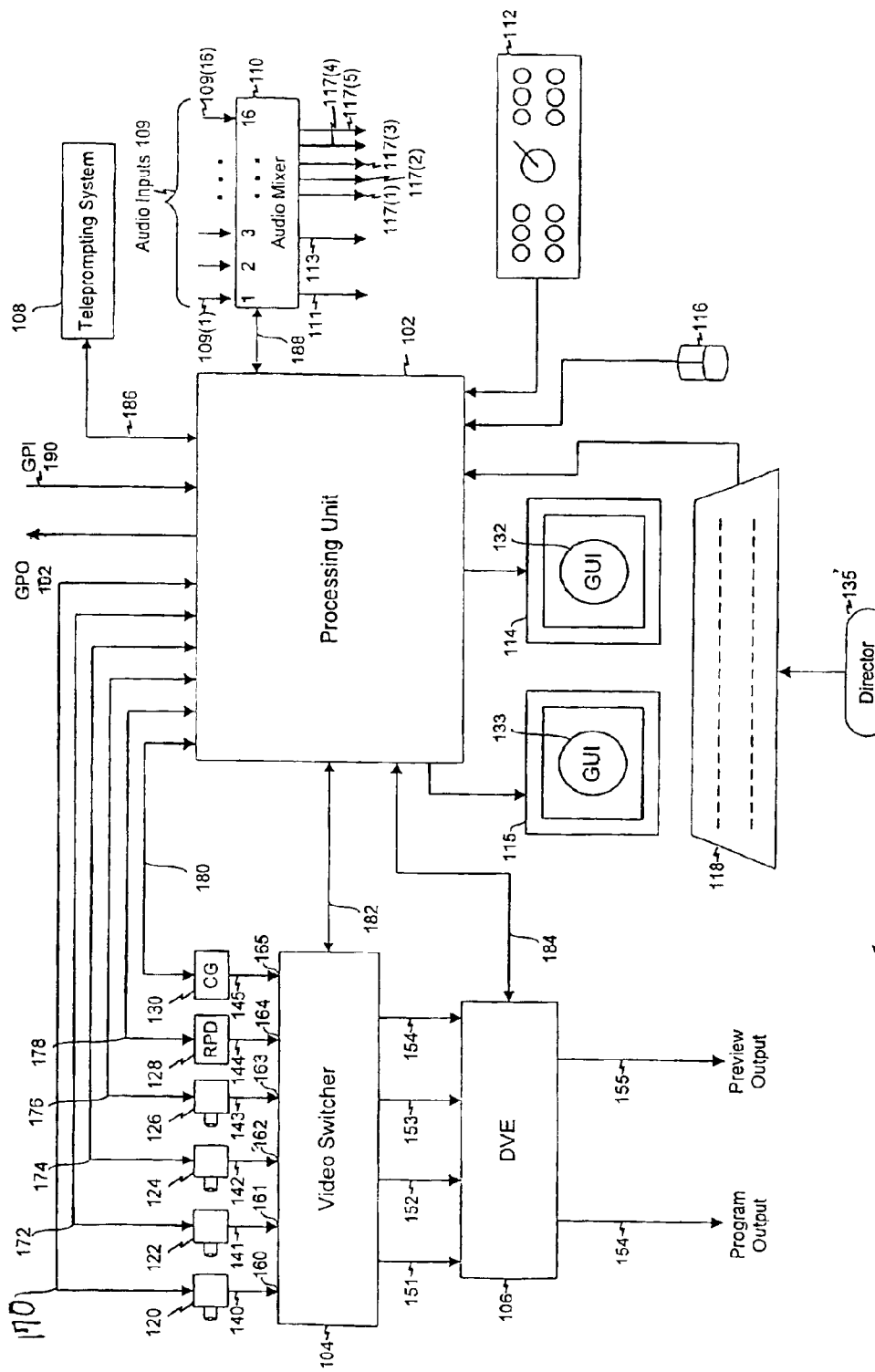
FIG. 1 illustrates a block diagram of the configuration of an embodiment of an integrated, fully automated media production system.

I. Overview of Media Production Tutorial System
II. Client Workstations
III. Media Production System
IV. Media Production Tutorial Management
  A. Tutorial Management Server
  B. Matriculation Manager
  C. Curriculum Manager
  D. Performance Manager
  E. Study Guide Manager
  F. Messaging Manager
  G. Tutorial Database V. Software and Hardware Embodiments
VI. Conclusion

I. Overview of Media Production Tutorial System

FIG. 3, illustrates, according to an embodiment of the present invention, a media production tutorial system 300 for providing automated media production training over a network connection 316. Tutorial system 300 supports live or live-to-tape media productions and online training that leverages cutting edge television production techniques for dynamic lesson planning, pre-planning and delivery. Referring to FIG. 3, tutorial system 300 includes one or more student workstations 304 (shown as 304a–304n); one or more instructor workstations 308 (shown as 308a–308m); one or more integrated media production systems 100 (shown as 100a–100l); network connection 316; media production tutorial management server 320; and tutorial system database 324.

FIG. 7 illustrates a typical layout of a training facility 700 for tutorial system 300. In an embodiment, training facility 700 includes a control room 704, studio area 708 and training area 712. Control room 704 and studio area 708 are components of a media production system 100, as discussed in detail below. Training area 712 includes work areas for an instructor 716 and at least one student 720. In this embodiment, each student 720 and instructor 716 utilize a student workstation 304 and instructor workstation 308, respectively, to communicate with tutorial system 300. As illustrated, system 300 supports a multi-purpose communication studio 708 that can be controlled from a single control room 704. Studio area 708 includes, in an embodiment, a news desk, video camera and chroma key wall or backdrop (that uses chroma key paint or material in blue or green) for weather, sports and any other student events, including an instructor lesson with video or graphic background with instructor chroma keyed in front. Control room 704 can be modeled after a digital automation broadcast station in order to simulate the processes necessary to properly educate and place student 720 in the broadcast industry.

Referring back to FIG. 3, bidirectional communications are provided between tutorial management server 320 and each student workstation 304, instructor workstation 308 and media production system 100 over a diverse computer network 316 which includes wired or wireless local area networks (LAN) or wide area networks (WAN), such as an organization's intranet, local internets, the global-based Internet (including the World Wide Web (WWW)), virtual private networks, or the like. Network 110 supports wired, wireless, or both transmission media, including satellite, terrestrial (e.g., fiber optic, copper, coaxial, hybrid fiber-coaxial (HFC), and the like), radio, microwave, and any other form or method of transmission. A plurality of student workstations 304, instructor workstations 308 and media production systems 100 can all be connected to each other by a central bus 312 (shown as 312a–312d) to form a local area network (LAN), wide area network (WAN), or the like as would be apparent to one skilled in the relevant art(s). Bus 312 can be a coaxial, fiber, HFC, copper or twisted cable used for bidirectional communications. Bus 312 can also represent radio, microwave, and any other form or method of transmission. Bus 312 is configurable to support broadband or baseband, such as Ethernet, network protocols.

In an embodiment of the present invention, tutorial system 300 utilizes a CODEC ISDN based technology for interactive communications with geographically dispersed students 720 within a school district as well as outside the school district. In addition, tutorial system 300 has downlink or cable access capability to receive broadcast signals from, for example, a school board for teacher/principal conferences or from other broadcast sources. In an embodiment, the broadcasts would support interactive phone line audio links for questions and answers. In this embodiment, microphones deposed on, for example, student workstations 304 would be capable of audio transmissions via telephone lines. In another embodiment, tutorial 300 is used over a wired or wireless LAN/WAN within the school building, on campus among multiple buildings or within a school district that includes multiple schools over a wide area network. In addition, a student 720 from home can access tutorial 300. In this application, home users can access the media production tutorial management server 320 via standard POTs modems (28.8 Kbps or 56 Kbps), cable modems, DSL modems or any other wired or wireless access available for Internet access back to server 320.

II. Client Workstations

As discussed above, tutorial system 300 communicates with one or more student workstations 304, instructor workstations 308 and media production systems 100 (collectively referred to herein as client workstations) over network connection 316. Each client workstation can be a personal computer, personal digital assistant (PDA), telephone, television or other device linked to computer network 316 and including a display device with the ability to select one or more curriculum lessons. In this embodiment, each student 720 and instructor 716 uses a student workstation 304 and instructor workstation 308, respectively.

The display device for the client workstations provides a text or graphical user interface (GUI) and enables a user (i.e., student 720, instructor 716, administrator, etc.) to interactively communicate with tutorial management server 320. The display GUIs provides graphical controls corresponding to various tutorial and media production commands. In an embodiment of the present invention, each student 720 and instructor 716 use a keyboard and/or mouse to interact with tutorial system 300 by manipulating the graphical controls of the display GUIs. In another embodiment, the client workstations are configurable to receive verbal commands to execute various tasks during media production. Using a rule-based expert system, a processing unit enables a voice recognition unit to identify the voice of student 720 and instructor 716 to recognize and process verbal commands to activate the graphical control. Other input devices can be a mouse wheel, joystick, rudder pedals, touch screen, microphone, joystick, stylus, light pen, or any other type of peripheral unit. The aforementioned is a representative list of input devices that can be used with the present invention, it should be understood that any other type of input device, as would be apparent to one skilled in the relevant art(s), could be easily included and would not change the scope of the invention. Any presently available or future developed device that is responsive to a general purpose interface is encompassed by the present invention.

An application program interface (API) interacts with the display GUI and the input device to support real time visual feedback and communications with the other components of tutorial system 300. Accordingly, in response to students 720 and directors activating a graphical control from the display GUIs, the client workstations transmit signals to tutorial management server 320 and media production systems 100 corresponding to the activated graphical control.

In an embodiment, CD-ROM technology is used to limit the amount of video and graphic information that requires distribution over the network. All video and graphic elements are stored on the CD-ROM with links and instructions to them residing at server 320. Once a student 720 activates the CD-ROM and logs in, the link is established between the CD-ROM and server 320. As a student 720 moves through the lesson plan, the links call up the appropriate graphic and video images associated with the lesson plan. This allows for better performance of the interactive tutorials in narrowband applications.

III. Media Production System

FIG. 1 illustrates, according to an embodiment of the present invention, an integrated media production system 100 for automating the execution of a show. The present invention contemplates analog and digital media environments. Each media production system 100 is preferably, but not necessarily, of the type described in commonly assigned U.S. Pat. Ser. No. 09/215,161, filed Dec. 18, 1998, by Holtz et al., and entitled "Real Time Video Production System and Method," (hereinafter referred to as the "the '161 application"); or U.S. Pat. Ser. No. 09/634,735, filed Aug. 8, 2000, by Snyder et al., and entitled "System and Method for Real Time Video Production and Multicasting," (hereinafter referred to as "the '735 application"). The disclosures of the '161 application and the '735 application are incorporated herein by reference as though set forth in their entireties.

As shown in FIG. 1, each media production system 100, in a representative embodiment, includes a processing unit 102 in communication with a variety of media production devices. Such media production devices include, but are not limited to, a video switcher 104; a digital video effects device (DVE) 106; an audio mixer 110; a teleprompting system 108; video cameras and robotics (for pan, tilt, zoom, focus, and iris control) 120, 122, 124, and 126; a record/playback device (RPD) 128; and a character generator and/or still store 130. RPD 128 can be a video tape recorder/player (VTR), a video server, a virtual recorder (VR), a digital audio tape (DAT) recorder, or any device that stores, records, generates or plays back via magnetic, optical, electronic, or any other storage media. Lines 170–188 represent logical communication paths between processing unit 102 and the media production devices 104–130 listed above.

While the above is a representative list of media production devices that can be used in the present invention, it should be understood that any other media production device, including, but not limited to, studio lighting devices, news automation devices, master control/media management automation systems, commercial insertion devices, compression/decompression devices (CODEC), video recorders/servers, and virtual sets, could be easily included and would not change the scope of the invention. Any presently available or future developed device that is responsive to a general purpose interface is encompassed by the present invention. In addition, live feeds (such as field news reports, news services, sporting events, and the like) from any type of source, including satellite, terrestrial (fiber, copper, coaxial, and the like), radio, microwave or any other form or method of media transmission, can be provided in lieu of media production devices in accordance with the present invention. The following books describe representative media production devices and methods and each is incorporated herein by reference: J. Van Tassel, "Advanced Television Systems," Butterworth-Heinemann, 1996; M. Robin and M. Poulin, "Digital Television Fundamentals," McGraw-Hill, 1998; A. Inglis and A. Luther, "Video Engineering," McGraw-Hill, 1996 (second edition); K. Blair Benson, "Television Engineering Handbook," McGraw-Hill, 1992 (revised edition); Zettl, "Television Production Handbook," Wadsworth, 1997 (sixth edition).

In an embodiment of the present invention, processing unit 102 communicates with standard media production devices using the Sony® Betacam™ protocol from Sony Corp., Tokyo Japan, or the Chyron® intelligent interface protocol from Chyron Corp., Melville, N.Y. However, the present invention can accommodate any presently available or future developed protocol for communicating and/or controlling media production devices.

There is also provided a general purpose input (GPI) interface 190 and a general purpose output (GPO) interface 192 for communicating with media production devices, such as character generators, virtual video recorders, cue tone encoders, master control switchers and media management automation systems and any other equipment that can accept as an input and/or output either momentary or latching general purpose interface triggers. In an embodiment, GPI 190 receives an electrical pulse signal and can be configured to trigger on the rise of the pulse signal, the fall of the pulse signal or on both the rise and fall of the pulse signal. GPO 192 is a contact closure that can be configured as a momentary or latching contact closure. It is also contemplated that GPI 190 and GPO 192 can accommodate other signaling schemes.

Because processing unit 102 is in communication with media production devices 104–130, processing unit 102 can send media production commands to and receive information from those media production devices. Processing unit 102, therefore, provides a means of centrally controlling each of the media production devices 104–130.

A video director 135 uses processing unit 102 to produce a show or show segment. Students 720 using student workstations 304, instructors 716 using instructor workstations 308 and an application program stored on tutorial management server 320 (discussed below) can also act as video director 135 to utilize processing unit 102 to produce a show or show segment. Thus, video director 135 is used herein to include student 720, instructor 716, and tutorial management server 320. In an embodiment, processing unit 102 displays graphical user interfaces (GUIs) 132 and 133 on display devices 114 and 115, respectively. In another embodiment, processing unit displays GUIs 132 and 133 together on a single display device.

GUIs 132 and 133 display graphical controls corresponding to the media production devices 104–130. In an embodiment of the present invention, video director 135 uses a keyboard 118 and a mouse 116 to interact with the processing unit 102 by manipulating the graphical controls of GUI 132, 133. In another embodiment, each media production system 100 is configurable to receive verbal commands to execute various tasks during media production. Using a rule-based expert system, processing unit 102 enables GUIs 132 and 133 to identify the voice of video director 135 to recognize and process verbal commands to activate the graphical control. As described in reference to the client input device, it should be understood that any other type of input device, including, but not limited to, a mouse wheel, joystick, rudder pedals, touch screen, microphone, stylus, light pen, or the like as would be apparent to one skilled in the relevant art(s) easily could be included and would not change the scope of the present invention. In response to video director 135 activating a graphical control from GUI 132 or 133, processing unit 102 transmits a media production command to the media production device corresponding to the activated graphical control. In this manner, video director 135 centrally controls the operation of each of the media production devices.

Figure 2A:
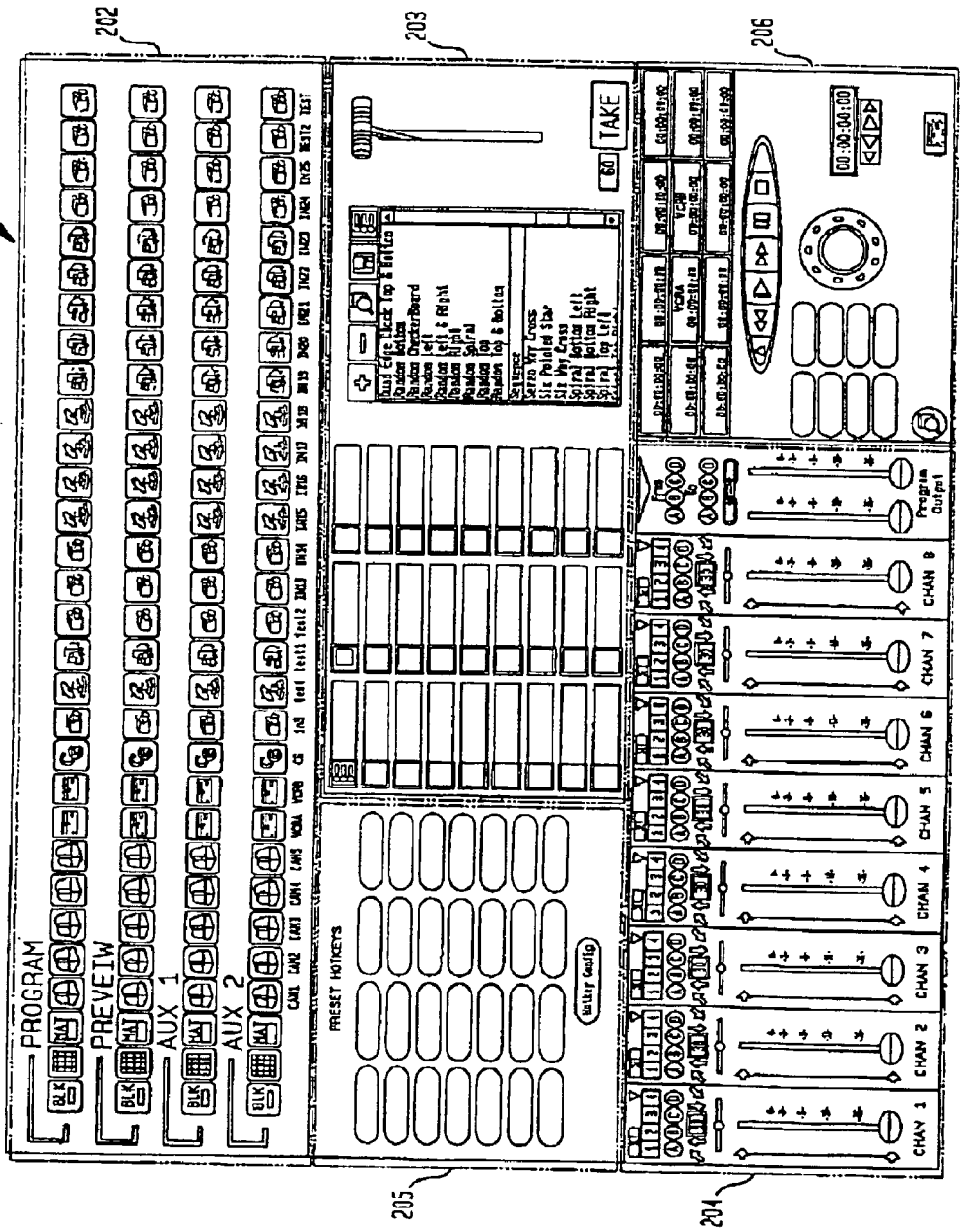
FIG. 2A illustrates an embodiment of graphical user interface 132.
Figure 2B:
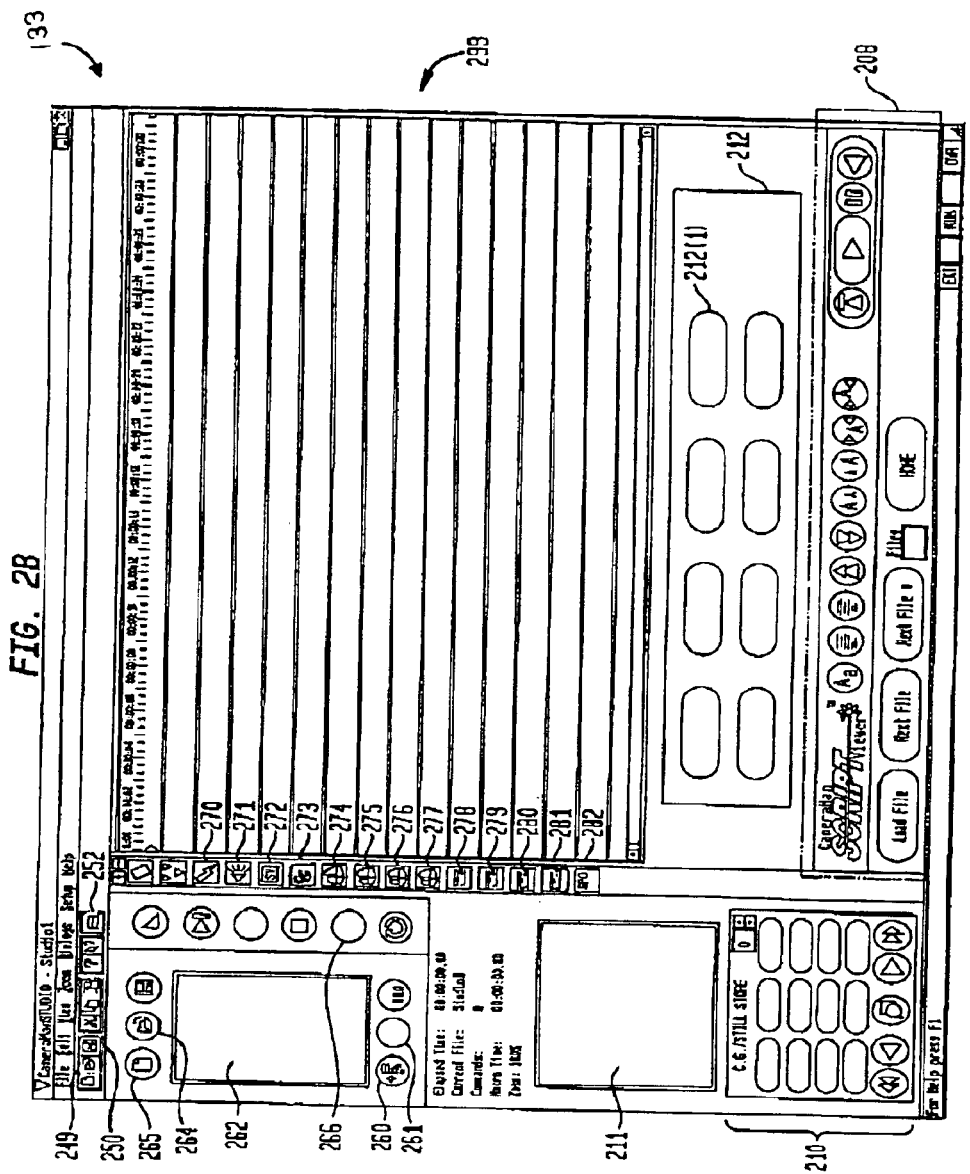
FIG. 2B illustrates an embodiment of graphical user interface 133.

FIGS. 2A and 2B illustrate an embodiment of GUI 132 and an embodiment of GUI 133, respectively. GUI 132 includes video switcher graphical controls 202 for controlling video switcher 104 and DVE 106; audio mixer graphical controls 204 for controlling audio mixer 110; RPD graphical controls 206 for controlling up to twelve RPDs; camera graphical controls 205 for controlling one or more cameras that are in communication with processing unit 102; and DVE controls 203 for controlling DVE 106. GUI 133 includes teleprompting system graphical controls 208 for controlling teleprompting system 108 and character generator (CG) graphical controls 210 for controlling one or more character generators, such as CG 130.

In addition to providing the above described graphical controls for manually controlling media production devices, processing unit 102 provides a means for automating the execution of a show. That is, processing unit 102 provides a means for executing a show without the need for an expensive production crew to control the media production devices.

The execution of a show is automated by creating and executing computer readable broadcast instructions, which are a set of media production commands, where each media production command is associated with a timer value and at least one media production device. In an embodiment, the broadcast instructions are created from the Transition Macro™ multimedia production control program developed by ParkerVision, Inc. (Jacksonville, Fla.) that can be executed to control an automated multimedia production system. As described in the '161 application and the '735 application, the Transition Macro™ program is a timeline-based application that allows serial and parallel processing of media production commands to automate the control of a multimedia production environment.

The following is an illustration of a simple set of broadcast instructions representing a "voice over" segment of a director's rundown sheet. The broadcast instructions include the following four media production commands and their associated timer values: (1) play RPD 128, one second; (2) fade up talent microphone (audio channel 109(1)), one second; (3) connect the video output 144 from RPD 128 to program output 154, two seconds; and (4) fade down talent microphone, ten seconds. The stated timer values indicate when the command is to be executed.

To perform the above broadcast instructions, video director 135 activates a timer. Processing unit 102 continuously monitors the timer. When the timer reads one second, processing unit 102 executes the first two commands simultaneously or substantially simultaneously. That is, when the timer reads one second, processing unit 102 performs the following steps: (1) processing unit 102 transmits a play command to RPD 128 and (2) transmits a command to audio mixer 110 that causes audio mixer 110 to fade up audio channel 109(1). When the timer reads two seconds, processing unit 102 transmits a control command to video switcher 104 and DVE 106 that causes video switcher 104 and DVE 106 to link program output 154 with the video switcher input port 164, which is coupled to a video output of 144 RPD 128, thereby connecting RPD 128's video output 144 with program output 154. Lastly, when the timer reads 10 seconds, processing unit 102 transmits a control command to audio mixer 110 that causes audio mixer 110 to fade down audio channel 109(1). In this manner, a media production is automated.

Processing unit 102 provides an automation control timesheet (hereafter "timesheet") 299 (see FIG. 2B) for creating and executing broadcast instructions. A set of broadcast instructions are created by placing icons onto timesheet 299, where each icon is associated with one or more media production commands and at least one media production device, or where each icon can be configured to be associated with one or more media production commands and at least one media production device. In an embodiment, the icons that form the graphical controls 202, 203, 204, 205, 206, 208, 210 can be placed on timesheet 299, as well as other icons from GUI 133, such as icons 270–282.

FIG. 10 illustrates an embodiment of timesheet 299. Timesheet 299 includes a timer 1002, which is represented as a horizontal time line, and fourteen control lines 1003–1016. There is also provided timer controls 1050 for controlling timer 1002. Timer controls 1050 include a start/step button 1052, a cue/reset button 1054, and a stop button 1056. Activating start/step button 1052 causes timer 1002 to run. Activating stop button 1056 causes timer 1002 to stop running. Activating cue/reset button 1054 causes timer 1002 to reset to zero (0) seconds.

Timesheet 299 can be reduced or enlarged by activating minus zoom icon 1025 or plus zoom icon 1024, respectively. Reducing timesheet 299 means that timer 1002 and all of the icons placed on timesheet 299 are scaled down, while maintaining the dimensions of timesheet 299. Similarly, enlarging timesheet 299 means that timer 1002 and all of the icons placed on timesheet 299 are scaled up, while maintaining the dimensions of timesheet 299.

In another embodiment of the present invention, timer sheet 299 includes DVE-DSK indicators that are used to inform the system operator, i.e. video director 135, of the current status of DVE and DSK effects as the show executes. The broadcast instructions must account for the required time to initiate and prepare the DVE and DSK effects for operation. The DVE can take, for example, five frames to initiate. External and internal DSK lights also require setup time. The DVE-DSK status lights indicate three states for the media production devices: "OFF," "PREPARATION," and "ON." "OFF" indicates the event is not being executed. "ON" indicates the event is in the process of being executed. "PREPARATION" indicates the event is being prepared for execution.

In an embodiment, control line 1004 is a DVE control line, which means that icon 270 can be placed onto control line 1004. Control line 1005 is an audio mixer control line, which means that icons from audio mixer graphical controls 204 and icon 271 can be placed onto control line 1005. Control line 1006 is a teleprompting control line, which means that icons from teleprompter graphical controls 208 and icon 272 can be placed onto control line 1006. Control line 1007 is a CG control line, which means that icons from CG graphical controls 210 and icon 273 can be placed onto control line 1006. Control lines 1008–1011 are camera control lines, which means that icons 274–277 can be placed onto control lines 1008–1011. Control lines 1012–1015 are record/playback device (RPD) control lines, which means that only icons from RPD graphical controls 206 and icons 278–281 can be placed on control lines 1012–1015. The media production system of the present invention allows audio/video feeds to be saved or retrieved by filename. The media can be integrated into the control lines and executed during a live broadcast. Alternatively, the media can be archived and broadcast at a later time.

Control line 1003 is a step mark line that can be used to control an action while the broadcast instructions are being executed. As shown in FIG. 10, a step mark icon 1018, a GPI mark icon 1020, and a user mark icon 1022 can be placed on control line 1003. As discussed in more details below, step mark icon 1018 can be used to pause or stop the broadcast instructions, and GPI mark icon 1020 can be used to create a contact closure when it is communicating with a GPI device. For example, if the broadcast instructions have been structured to send a GPO command to cue and run a commercial from a GPI device, GPI mark icon 1020 can be used to restart the broadcast instructions after the GPI device sends a return command indicating that the commercial has concluded.

User mark icon 1022 is provided for precisely associating a particular timer value with an icon placed on timesheet 299. For example, if video director 135 desired to place an icon 270 onto control line 1004 such that the timer value associated with icon 270 is exactly 10 seconds, video director 135 first drags and drops user mark icon 1022 onto step mark control line 1003 at the ten second mark on timer 1002. Video director 135 would then drag and drop icon 270 onto the user mark icon 1022. Icon 270 is then automatically placed onto control line 1004 such that the timer value associated with icon 270 is ten seconds. In short, any icon that is drag and dropped onto the user mark 1022 is automatically placed on the appropriate control line (i.e., 1004–1016) and with a timer value designated by user mark 1022. Accordingly, user mark icon 1022 can be used to cause several events to occur at the same point on the timer 1002. As such, activating user mark icon 1022 would cause each of the designated events to "snap-to" the same start time as the user mark on their appropriate control line (i.e., 1004–1016).

Label icon 1023 can also be placed on control line 1003 to allow video director 135 to name a segment or portion of timesheet 299. Once label icon 1023 is dragged and dropped onto control line 1003, video director 135 can double click the icon to open up a dialogue box that allows video director 135 to enter in text. The text is then displayed on the label icon. This allows video director 135 to label one or more portions of timesheet 299.

In the above manner, broadcast instructions provide for automatic control of media production devices and allows video director 135 to execute a show without a production crew.

Figure 15:
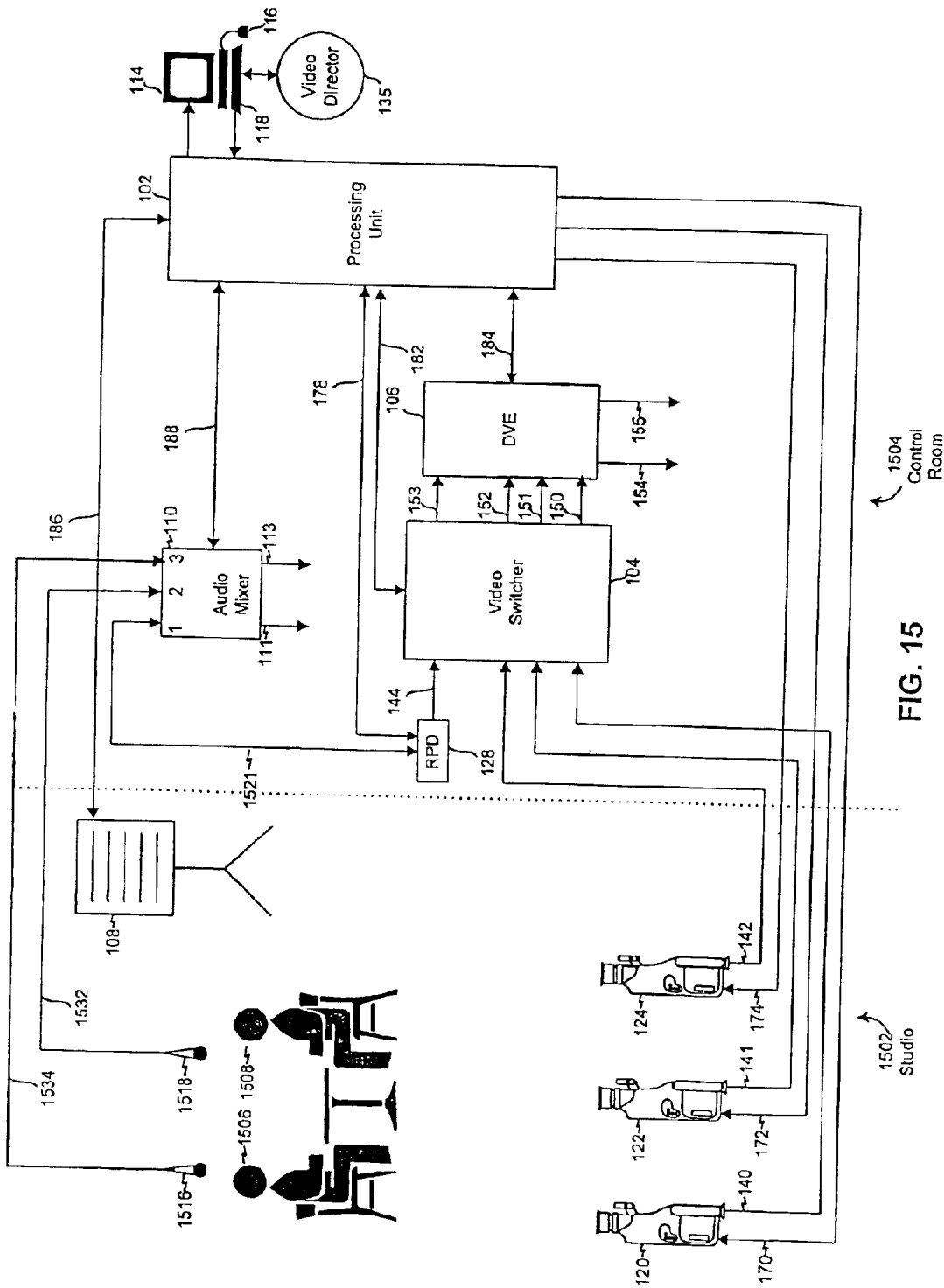
FIG. 15 illustrates an exemplary media production studio.

An example show and an example set of broadcast instructions for automating the execution of the example show is described with reference to FIGS. 15 and 16. FIG. 15 illustrates an exemplary media production studio 1502 and an exemplary media production control room 1504. The example is a talk show with one host 1506 and one guest 1508.

In an embodiment, processing unit 102, video switcher 104, DVE 106, RPD 128, and audio mixer 110 are all within control room 1504. Cameras 120, 122, and 124 and microphones 1516 and 1518 are in the studio 1502. Video outputs 140, 141, and 142 from cameras 120, 122, and 124 are coupled to video switcher input ports 160, 161, and 162, respectively. Video output 144 of RPD 128 is coupled to video switcher input port 164. Audio output 1521 from RPD 128 is coupled to input 1 of audio mixer 110. Audio outputs 1532 and 1534 from microphones 1518 and 1516 are coupled to input 2 and 3 of audio mixer 110, respectively. Consequently, audio output 1521 is designated audio input channel one, audio output 1532 is designated audio input channel two, and audio output 1534 is designated audio input channel three.

The first step in automating the execution of the talk show is to pre-produce the show. Pre-producing a show means defining a production script for the show and then defining a director's rundown sheet for the show. A production script for a show defines the show's segments or layout. A director's rundown sheet defines all of the desired media production settings for each segment and all of the media production transitions between segments. For this example, the production script for the talk show has five segments, which are shown below:

(1) Welcome by host (6 seconds)
(2) Brief discussion between host and guest (8 seconds)
(3) Guest provides information on a movie the guest is starring in (8 seconds)
(4) Show brief video clip (4 seconds)
(5) Wrap-up and closing by host.

For this example, the desired media production settings are as follows. For the first segment, camera 120 is set to give a close-up shot of host 1506 and camera 120's video output 140 is coupled to program output 154, and the host's microphone 1516 is brought up.

For the second segment, camera 122 is set to give a wide shot of both the host 1506 and the guest 1508 and its video output 141 is connected to program output 154, and the guest's microphone 1518 is brought up. Because the program output has changed from camera 120 to camera 122 in going from segment one to segment two, a video transition needs to be defined. Possible video transitions include fading, wiping, or cutting. For this example, the transition will be a cut from camera 120 to camera 122.

For the third segment camera 124 is set to give a close-up shot of guest 1508 and its video output 142 is selected for program output. The video transition will be a cut from camera 122 to camera 124.

For the fourth segment video output 144 of RPD 128 is selected for program output, both the guest's and the host's microphone 1516 and 1518 are brought down, audio output 1521 of RPD 128 is brought up, the video transition is a fade from camera 124 to RPD video output 144, and RPD 128 is programmed to play a video segment.

For the fifth and final segment of the show, the video transition is a fade from RPD video output 144 to camera 120, camera 120 is set up for a close-up shot of the host 1506, the host's microphone 1516 is brought up, and audio output 1521 of RPD 128 is brought down.

After pre-producing a show as described above, video director 135 places the appropriate icons onto timesheet 299 to create broadcast instructions that will be used to automate the execution of the show.

Figure 16:
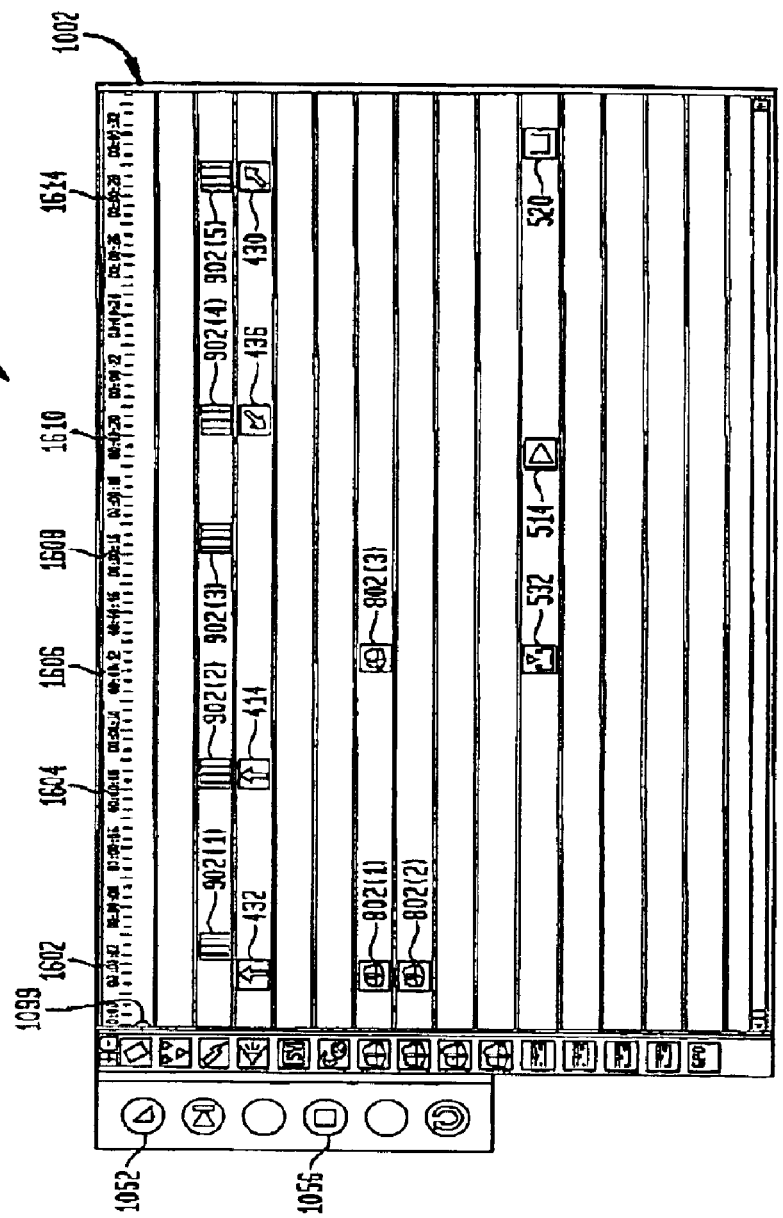
FIG. 16 illustrates an example timesheet 1600.

FIG. 16 illustrates a simple example timesheet 1600 for producing the talk show described above. Obviously, other more complex broadcast instructions could be used to produce the talk show. FIG. 16 illustrates a fully automatic timesheet 1600. In other words, the broadcast instructions do not cause timer 1002 to pause at predetermined pause points. However, the present invention also contemplates semi-automatic broadcast instructions. Semi-automatic broadcast instructions are broadcast instructions that pauses timer 1002 at predetermined pause points. Semi-automatic broadcast instructions provide video director 135 with greater control in executing a show.

Referring again to FIG. 10, semi-automatic broadcast instructions are created using step mark icon 1018 or GPI mark icon 1020. By placing a step mark icon 1018 or a GPI mark icon 1020 onto step mark control line 1003, video director 135 specifies a point when timer 1002 should automatically stop running.

That is, timer 1002 stops running without video director 135 having to activate the stop button 1056 or without an external device transmitting a timer stop command to processing unit 102. After timer 1002 is stopped by a step mark icon 1018, timer 1002 can be restarted either manually by the video director 135 activating start/step button 1052 or automatically by an external device, such as the teleprompting system 108, transmitting a step command to processing unit 102. Similarly, after timer 1002 is stopped by a GPI mark icon 1020, timer 1002 can be restarted by receiving a GPI input on GPI interface 190.

Step mark icon 1018 and GPI mark icon 1020 also serve to logically break broadcast instructions into two or more segments. Video director 135 places step mark icon 1018 and GPI mark icon 1020 onto step mark control line 1003 by dragging and dropping step mark icon 1018 and GPI mark icon 1020, respectively.

A preview feature is provided with the semi-automatic feature described above. The preview feature allows video director 135 to preview a video signal before it is transitioned to program output 154. Typically, preview output 154 is connected to a preview monitor. This allows video director 135 to see exactly what the next camera shot looks like before the next camera shot is coupled to program output 154. This feature is important when executing a live show, such as a nightly news broadcast.

The broadcast instructions, whether semi-automatic or fully automatic, can be stored in a file for later retrieval and modification. This allows video director 135 to store show "templates." A show template is a generic set of broadcast instructions that can be re-used many times to produce a variety of different shows. By storing show templates, new shows can easily be produced by leveraging a previously created broadcast instructions. Video director 135 recalls the template by filename, makes the necessary modifications as required (according to the new rundown sheet) and saves the broadcast instructions with a new filename. Leveraging "templates" can save time, improve quality and preserve format consistency.

Referring back to FIG. 2B, Video director 135 saves a set of broadcast instructions to a file by activating a save button 250. Upon activating save button 250, video director 135 is prompted for a filename. After providing a filename, the current broadcast instructions are saved with that filename. The broadcast instructions can then be retrieved at a later time, modified, and saved under a new name by activating a "save as" button 252. To open a previously saved set of broadcast instructions, video director 135 activates an open file button 249. Upon activating open file button 249, video director 135 is prompted for a filename. At this point, video director 135 enters the desired filename and the file is then retrieved and the broadcast instructions are displayed on timesheet 299. All of these commands are also accessible through pull-down menu items on GUI 133.

Referring still to FIG. 2B, in an embodiment, video director 135 has the capability to create a broadcast instructions play-list. A broadcast instructions play-list is a sequential list of broadcast instructions files.

Video director 135 creates a broadcast instructions play-list by inserting broadcast instructions files into play-list window 262. To insert a broadcast instructions file into play-list window 262, video director 135 activates an insert file button 260. Upon activating insert file button 260, video director 135 selects a broadcast instructions file that has been previously saved and stored in processing unit 102. After video director 135 selects a broadcast instructions file, the broadcast instructions file is inserted into play-list window 262. To insert additional broadcast instructions files to play-list window 262, video director 135 merely activates insert file button 260. To delete a broadcast instructions file from play-list window 262, video director 135 selects the broadcast instructions file using mouse 116 or other device, and then either drags the file to delete icon 261 or activates a delete button on keyboard 118.

Video director 135 can also name and save a broadcast instructions play-list. To name and save a broadcast instructions play-list, video director 135 activates save button 265. Upon activating save button 265, video director 135 is prompted to name the broadcast instructions play-list. After naming the broadcast instructions play-list, the broadcast instructions play-list is saved to a file. To load a previously saved broadcast instructions play-list into play-list window 262, video director 135 activates play-list open button 264. Upon activating play-list open button 264, video director 135 selects a broadcast instructions play-list that has been previously saved and stored to a file. After video director 135 selects a broadcast instructions play-list, each broadcast instructions file that is in the play-list is inserted into play-list window 262. To insert additional broadcast instructions files to play-list window 262, video director 135 merely activates insert file button 260.

Once a play-list has been created by inserting broadcast instructions files into play-list window 262, the play-list can be executed automatically with a touch of a single button. To automatically execute a play-list, video director 135 first double clicks the top broadcast instructions file in play-list window 262, thereby loading the top broadcast instructions file in the play-list into timesheet 299. Video director 135 then activates auto-play/step button 266. Activating auto-play/step button 266 activates timer 1002. When the currently executing broadcast instructions finish executing, the next broadcast instructions file specified in the play-list is loaded into timesheet 299 and automatically executed. This process continues until all of the broadcast instructions files in the play-list are executed.

The advantage of the broadcast instructions play-list feature is that it enables the video director 135 to execute a show using multiple sets of broadcast instructions. Consequently, instead of creating one very large set of broadcast instructions to execute a show, a video director 135 can create several small, more manageable sets of broadcast instructions to execute the show.

The present invention permits video director 135 to manually prepare and enter the broadcast instructions into an automation control timesheet (e.g., timesheet 299 or timesheet 1600). In another embodiment, the present invention allows for a director's rundown sheet to be automatically converted into a set of broadcast instructions. In this embodiment, video director 135 would create, or select from a list of predefined, broadcast element (BCE) files to prepare a rundown sheet, as described in commonly assigned U.S. Pat. Ser. No. 09/822,855, filed Apr. 2, 2001, by Holtz et al., and "Method, System and Computer Program Product for Full News Integration and Automation in a Real Time Video Production Environment," (hereinafter referred to as "the '0001 application"). The disclosure of the '0001 application is incorporated herein by reference as though set forth in its entirety.

Typically, each line within a set of broadcast instructions corresponds to a media production station and/or equipment.

This grouping of commands (i.e., line of broadcast instructions) to represent an element or group of elements is known as a BCE file (such as, the Transition Macro™ Element (TME) file developed by ParkerVision, Inc.). BCE files can represent a single line on the director's rundown or multiple lines that represent a complete story. Accordingly, the director would create or choose BCE files comprising all the media production commands necessary to represent an element on the show rundown. Accordingly, all the commands that the director would need to communicate with the production crew are illustrated and stored in the BCE files. In other words, the BCE files can be programmed to represent typical show segments found in the show rundown, such as INTRO/PKG/TAG, VO, SOT, OTS, VO/SOT combination, on camera and other elements or segments of a show.

Once video director 135 prepares the rundown by created or choosing the appropriate BCE files, video director 135 instruct processing unit 102 to import the BCE files and associated broadcast instructions into timesheet 299 (or 1600. Instructions can be provided by activating an icon (not shown) on GUI 133, using a pull-down menu, issuing verbal commands, or the like.

As a show is executed from a set of broadcast instructions, a show script file is created and stored by filename for seamless, continuous scrolling and future recall. Each segment on the show has an associated story file that contains the script and related elements. As each segment is broadcast, the story file for the subsequent segment is automatically appended to the story file for the active segment. After a story file is appended within the show script file, the broadcast instructions for the subsequent segment cannot be deleted from system 100. Processing unit 102 would then automatically execute the subsequent segment and its story file would be recorded in the show script file. In another embodiment, video director 135 can manually alter the broadcast instructions for the subsequent segment after the story file has been appended in the show script file, and all changes to the media production commands would be recorded in the appended story file. The appended file also includes instructions for teleprompting system 108 to cue the talent for the upcoming news story, i.e. VO, SOT, CAM-3, and the like. Upon completion of the broadcast, the show script file contains all of the appended files.

In an embodiment of the present invention, an online user (e.g., student 720, instructor 716, and the like) can browse a web page served by media production system 100 and select an entire show or segments from a show for on-demand viewing. After the user makes the selection by clicking on one or more icons, processing unit 102 for system 100 would load and execute the prerecorded show script file to feed the video show over the Internet (e.g., network connection 316), or subscript files of selected segments to the users. In an embodiment, system 100 encodes the broadcast instructions for the show or segment to be streamed over the Internet (e.g., network connection 316). As described in the '735 application, encoding permits the appropriate show segment(s) partitioned, tagged, stored to be subsequently retrieved for subsequent transmissions.

Referring back to FIG. 2B, another feature of the present invention is that a set of broadcast instructions or a subset of broadcast instructions can be associated with one of many hot-keys 212. When a hot-key 212 is activated by video director 135, the broadcast instructions or a subset of broadcast instructions associated with the hot-key 212 is automatically inserted into the current executing broadcast instructions wherever time indicator 1099 happens to be located. The video director 135 can activate a hot-key 212 at any time, even when the current executing broadcast instructions are in the middle of being executed.

A further feature is that each hot-key has an associated label for identifying each hot-key 212.

Hot-keys 212 are typically used for "late breaking news" stories that come in after a show has been pre-produced and after a set of broadcast instructions has been created to execute the show. Typically, a video director 135 creates one or more sets of late breaking news broadcast instructions and associates each set of late breaking news broadcast instructions with a hot-key 212. Thus, when a late breaking news event occurs, video director 135 merely needs to activate one of the hot-keys 212 to insert a late breaking news segment into a pre-existing set of broadcast instructions.

In an embodiment, video director 135 associates a set or subset of broadcast instructions with a hot-key 212 by selecting one or more icons that have been placed onto timesheet 299. After selecting the one or more icons, video director 135 selects one of the hot-keys 212, such as hot-key 212(1). As a result, the selected icons are associated with hot-key 212(1). When video director 135 activates hot-key 212(1), the icons associated with hot-key 212(1) are inserted into the current broadcast instructions that are displayed on timesheet 299. In this manner, in the event of last minute changes to a show's script, video director 135 can modify the show's broadcast instructions to create a new set of broadcast instructions that recognizes the changes to the script, even when the show is in the process of executing.

Alternatively, instead of using hot-keys 212 to modify an existing set of broadcast instructions, video director 135 always has the ability to modify an existing set of broadcast instructions by adding icons to and deleting icons from timesheet 299. However, hot-keys 212, provide a quicker and more precise way to add icons to an existing set of broadcast instructions. In addition, new broadcast instructions can be assembled using pre-configured hot-keys 212 or using a combination of hot keys 212 and dragging and dropping icons.

Another feature of the present invention is that as the video show is executed, the broadcast instructions route signals to a tally controller on video switching, audio mixing and other configurable conditions to control tally lights on cameras, monitors and other equipment to make personnel and talent aware of "status." This tally controller also activates the lights based on the activity inside the studio, e.g. "ON AIR."

Another feature provided by the present invention is that video director 135 always has the ability to manually control the media production devices in communication with processing unit 102. This is true even when broadcast instructions are being executed. Thus, at any time, video director 135 can assume manual control over a media production. That is, video director 135 can manually control any media production device.

IV. Media Production Tutorial Management
A. Tutorial Management Server

FIG. 4 illustrates, according to an embodiment of the present invention, a block diagram of media production tutorial management server 320. FIG. 4 is a conceptual illustration of tutorial management server 320 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

Tutorial management server 320 represents one or more computers providing various shared resources with each other and to the other network computers. The shared resources include files for programs, web pages, databases and libraries; output devices, such as, printers, plotters and audio/video recorders and players; and communications devices, such as modems and Internet access facilities. The communications devices can support wired, wireless or both communications, including satellite based, and the like. The server is configured to support the standard Internet Protocol (IP) developed to govern communications over public and private Internet backbones. The protocol is defined in Internet Standard (STD) 5, Request for Comments (RFC) 791 (Internet Architecture Board). The server can also support transport protocols, such as, Transmission Control Protocol (TCP), User Datagram Protocol (UDP) and Real Time Transport Protocol (RTP). The server is also configured to support various operating systems, such as, the Netware™ system available from Novell®; the MS-DOS®, Windows NT® and Windows® 3.xx/95/98/2000 systems available from Microsoft®; the Linux® system available from Linux Online Inc.; the Solaris™ system available from Sun Microsystems, Inc.; and the like as would be apparent to one skilled in the relevant art(s).

As shown in FIG. 4, tutorial management server 320 in a representative embodiment, includes an assembly manager 408, tutorial controller 416, matriculation manager 420, curriculum manager 424, performance manager 428, study guide manager 432, messaging manager 436 and database controller 440. Tutorial management server 320 is in communication with tutorial management database 324 (shown in FIG. 4 as curriculum database 324*a* and institution database 324*b*).

Assembly manager 408 exchanges signals or requests, i.e. IP datagrams or data packets, across network 316 with student workstations 304, instructor workstations 308 and media production systems 100 (workstations 304 and 308 and systems 100 are collectively referred to herein as "client workstations"). The data packets are sent to tutorial controller 416 where they are routed to matriculation manager 420, curriculum manager 424, performance manager 428, study guide manager 432 and/or messaging manager 436, as appropriate (managers 420–436 are collectively referred to herein as "tutorial application managers"). Accordingly, the data packets wait in assembly manager 408 until a suitable tutorial application manager can be identified by tutorial controller 416. Tutorial controller 416 identifies the suitable tutorial application manager by, for example, reading the destination header frames and evaluating the capacity and current workload of the designated tutorial application manager.

B. Matriculation Manager

One tutorial application manager is matriculation manager 420. Matriculation manager 420 registers all clients and maintains a current list of all clients that have been authorized to access and utilize tutorial management server 320. Clients include students, instructors, and administrators from an educational institution, such as a high school, university, employer-provided training facility and the like. A client profile, including the scope of each client's authorization is maintained in institution database 324*b*, as discussed in detail below. Each client profile includes a unique identification number that identifies the client. For instance, each student would be assigned a Student_ID, each instructor would have an Instructor_ID, each institution would have an Institution_ID used by the institution's system administrator, and the like. As such, matriculation manager 420 maintains the security of system 300 by restricting access to each client's records and other administrative features of tutorial management server 420.

To participate in a tutorial session, each client must register with matriculation manager 420 to create a client profile. The client profile would include demographic data for each client, such as name, geographic address, electronic mailing (email) address, age, gender, educational background, and the like, as would be apparent to one skilled in the relevant art(s). The client profile can also include data about the respective client workstations, such as model, manufacturer, serial number, operating system, browser software, word processing programs, graphics software, memory capacity, microprocessor speed, and the like, as would be apparent to one skilled in the relevant art(s). The profile data is used to determine whether the client workstations meet the basic configuration requirements to receive media streams from tutorial management server 420. The profile data can also be used to configure the media streams to make them compatible with the client workstations. For example, the media streams can be formatted to support Apple®, Microsoft®, or RealNetworks® multimedia applications; Netscape® and Microsoft® browsers capable of handling Java 1.1 or higher; Windows®, Novell® or Linux® operating systems; HyperText Markup Language (HTML), Synchronized Multimedia Integration Language (SMIL), Extensible Markup Language (XML), Allaire® Cold Fusion, Appleg Web Objects®, Haht Site®, PHP, Aestiva® scripting languages; or the like as would be apparent to one skilled in the relevant art(s). In an embodiment, the media streams can be formatted to support GIF for graphics, JPEG for photographs, Apple® QuickTime® for dynamic media (i.e., audio and video), Macromedia® Flash™ for simple animation, Macromedia® Shockwave® for more advanced animation, and Adobe® Acrobat® for manuals. The profile data can be updated on a periodic basis, as discussed below.

Each client profile can also contain a password generated by matriculation manager 420 or designated by the client. To initialize a tutorial session with tutorial management server 320, the client would be prompted to enter the assigned identification number and password. The identification number and password would be verified against the data stored in the client profile. Access would be granted if the data matches and the client's account is in good standing. If access is denied for whatever reason, matriculation manager 420 routes, for example, a Java applet to the respective client workstation to create a dialog box to inform the client that access has been denied.

Matriculation manager 420 also supports billing and accounting. As discussed, each client must register with tutorial management server 420. After a client registers, the client would be billed for the requested services. In an embodiment, a Java application prepares an invoice and bills the clients sending the invoice electronically to the client's email address. Alternatively, the invoice can be printed and mailed to the client's geographic address. Payment can also be accepted electronically by receiving and verifying a credit or debit card number or receiving electronic find transfers from an authorized bank account, or the like as would be apparent to one skilled in the relevant art(s). Upon receipt of proper payment, the client's registration or account would be placed in a good standing status. Only if the client's account is in good standing would the client be able to have access to certain system features, including participation in tutorial sessions.

Matriculation manager 420 can also be configured to restrict access to certain system features of tutorial management server 320. For instance, an designated instructor 716 can be authorized to access the student records for all students registered for the instructor's class. However, an individual student 720 may only have access to that student's own records. Alternatively, student 720 can be authorized to receive only certain tutorial lessons that instructor 716 has approved for student 720 to receive. Moreover, student 720 can be restricted from receiving the lesson until student 720 has properly registered and paid for the course, as discussed above. To restrict or grant access to certain features of tutorial management server 420, a table can be generated identifying the scope of each client's use of the system 300. As an alternative, this information can be recorded in the client's profile. Accordingly, each time a client requests access, matriculation manager 420 verifies whether the client is authorized to receive the requested communication.

Matriculation Manager 420 also acknowledges that a student 720 belongs to a specific class as identified by instructor 716. Instructor 716 can enter names matriculated in the class and assign passwords for access. In addition, Instructor 716 can place limits whereby students 720 cannot go beyond certain points in the lesson to get ahead of the class as an example. Students 720 have these limits as well as progress limits that do not allow access to other lesson plans without satisfactory performance on quizzes and unit tests, as described below.

C. Curriculum Manager

Tutorial management server 320 also includes curriculum manager 424. Curriculum manager 424 delivers lesson contents to student 720 over network 316. The lesson contents would provide a comprehensible media production curriculum. In an embodiment, a Java application sends instructions to each student workstation 304 to display the lesson contents on the workstation's display (e.g., GUI). The lesson contents comprise text, graphics, audio, video, or any combination thereof. In an embodiment, the subject matter of the lesson contents cover three levels of complexity: beginning, intermediate and advanced. Within each level, the lesson contents can be divided into a plurality of units. Each lesson unit is built around one or two learning objectives. For example, "Unit 1" can pertain to the history of television production. Unit 2 can pertain to the types of camera equipment. Unit 3 can pertain to the types of audio equipment. Unit 4 can pertain to video editing. In short, the units can cover a variety of media production concepts, equipment, techniques and related topics, including, but not limited to, lighting, transition effects, live studio production and the like as would be apparent to one skilled in the relevant art(s). The text for each unit can be approximately one to four paragraphs in length (the equivalent of one web page).

In an embodiment, each lesson unit can be further divided into sections and subsections dealing with more specific topics. Moreover, each lesson unit can include tests or section quizzes that can be generated to evaluate the ability of student 720 to comprehend each unit or section, as appropriate.

Curriculum manager 424 prepares and routes the lesson contents to student workstations 304. FIG. 9 illustrates an embodiment of GUI 900 for displaying the lesson contents on student workstations 304. GUI 900 includes a navigation bar 904, script window 942, lesson key 938 and supporting media window 948. Navigation bar 904 contains a plurality of buttons or icons 908–934 that can be activated to perform various functions during the course of the tutorial lesson. Lesson key 938 identifies the specific lesson that student 720 is currently viewing on GUI 900. For example, referring to FIG. 9, lesson key 938 identifies the lesson as being taken from Unit 2, entitled "Camera" and Section 2.1, entitled "Basic Shots." The text for the lesson is displayed in script window 942. GUI 900 can also include supporting media window 948 to provide illustrations, examples or models to support the subject matter of the text displayed in script window 942. The media streamed to supporting media window 948 can take various forms. For example, referring to FIG. 9, supporting media window 948 can display a graphic, such as an illustration of a tripod. In another embodiment, supporting window 948 can display video, audio or multimedia, including, but not limited to, animations, illustrations, photographs, other graphical or high bandwidth information, and the like, as would be apparent to one skilled in the relevant art(s).

In an embodiment, GUI 900 is configurable to support a glossary feature. In this embodiment, the text in script window 942 can include one or more terms that can be further explained. The terms can be designated by hyperlinks or hot spots, identified by, for example, a different color, font or style than the remaining text. The hyperlinks would provide client access to a glossary stored in curriculum manager 324a. In other words, student 716 can obtain additional information about a designated term in script window 942 by, for example, clicking on the term to activate its hyperlink. The glossary request would be routed to curriculum manager 424 who communicates with matriculation manager 420 to determine the student's access rights. If authorized, curriculum manager would obtain the glossary records from curriculum manager 324a and route the information to the respective student workstation 304. In an embodiment, a Java application in student workstations 304 would create a separate window to display the glossary information to provide amplification and clarification of the term. The term would be highlighted in the glossary window. Clicking on the highlighted term would cause the window to be withdrawn and the lesson section would once again appear on GUI 900. As would be apparent to one skilled in the relevant art(s), other formats can be used for presenting and withdrawing the glossary window, such as activating a icon, using a pull down menu, double-clicking the window, and the like.

Navigation bar 904 enables student 720 to control the tutorial session. For example, directional icons 924 (shown in FIG. 9 as 924a, 924b and 924c) enables student 720 to move among the various sections in each lesson unit. Referring again to the example in FIG. 9, lesson key 938 indicates student 720 is currently viewing Unit 2, Section 2.1 on GUI 900. Activating "next" directional icon 924c would take student 720 to the next section or subsection in Unit 2. If student 720 activates "previous" directional icon 924a, GUI 900 would display the Unit and Section last visited by student 720. Alternatively, activating previous directional icon 924a can take student 720 to the previous section or subsection in the Unit currently displayed in lesson key 938 (i.e. Unit 2). In an embodiment of the present invention, a Java applet in each student workstation 720 routes the requests for current, next and previous Sections to curriculum manager 424.

Navigation bar 904 also includes announcement icon 908, syllabus icon 912, examination icon 916, review icon 920, help icon 930 and exit icon 934. The functionality of announcement icon 908, examination icon 916 and review icon 920 are discussed in the following sections. Activating help icon 930 would send a request to curriculum manager 424 for online assistance during the tutorial session. Help icon 930 enables the client to receive real time, online information about using a particular feature of system 300. System 300 supports both general and context sensitive help requests. For example, in response to a help request, curriculum manager 424 can send to the respective student workstation 304 an index of all keywords or topics related to tutorial system 300. Alternatively, curriculum manager 424 can filter the index to send only information related to the context of the current tutorial session.

Activating help icon 930 temporarily suspends the tutorial session while student 720 views the online assistance content. To return to the tutorial session, student 720 can activate "current" directional icon 924b. Current directional icon 924b would return student 720 to the Section that was being displayed prior to the interruption. Activating exit icon 934 would terminate the current tutorial session, i.e. current lesson unit.

In an embodiment, curriculum manager 424 tracks and marks the placement of student 720 during the lesson units, such that if the tutorial session is interrupted (i.e., terminated or suspended), for whatever reason, curriculum manager 424 can return student 720 to the section last routed to the respective student workstation 304. In essence, curriculum manger 424 is configured to remember where student 720 has been, what lesson units/sections have been read, and in general, tracks the student's progress. As a result, each student 720 is not required to go through the lesson units/sections in any specific order, nor would they be required to receive all lesson units/sections.

As such, student 720 can select any authorized lesson unit/section, in any order, from a hierarchical listing of lessons or syllabuses. Activating syllabus icon 912 would send a request to curriculum manager 424 to temporarily suspend an active tutorial session and send a listing of all syllabuses for the lesson units. Alternatively, curriculum manager 424 can send only the syllabus for the current lesson unit or the lesson unit(s) student 720 has been authorized by matriculation manager 420 to receive.

Each lesson unit contains a syllabus that describes the objectives and contents, including all sections, of the respective tutorial lesson. FIG. 11 illustrates an embodiment of GUI 1100 for displaying an exemplary syllabus page on student workstations 304. As can be seen in this embodiment, GUI 1100 provides a listing of all lesson units in unit window 1120. Referring to FIG. 11, in this exemplary embodiment, unit window 1120 comprises a listing of twenty lesson units. The list can be presented in expandable/collapsible form. Unit window 1120 also includes an icon or hot spot that is related to each unit. Activating one of the unit icons or hot spots would cause a complete syllabus for the respective unit to be generated and displayed in section window 1140. For example, referring to FIG. 11, activating unit icon 1124 would cause section window 1140 to display the syllabus for the lesson Unit No. 2, entitled "Camera." Alternatively, the text adjacent to icon 1124 is a hot spot that can be activated to display the syllabus in section window 1140. In an embodiment, the icons (e.g., 1124, 1144, 1148) in windows 1120 and 1140 are symbols for visual progress reports represented by colors. The color scheme can be used to specify whether a student 720 has visited, completed or successfully tested a lesson or the like.

The icons or hot spots in section window 1140 provide additional icons or hot spots for selecting the lesson sections available in the respective unit. For example, activating section icon 1144 or the hot spots linked to the text adjacent to it would cause the display GUI to display the lesson for Section No. 2.1 in the subsection entitled "Tripods," as described in reference to GUI 900 in FIG. 9. As discussed, an embodiment of the present invention provides section and unit icons that indicate the student's status for each section. For example, a color scheme can be provided to indicate the sections that have been completed. Alternatively, another icon (not shown) can be used to indicate the status as being, for example, "not visited," "section in progress," "lesson visited but no yet tested," "lesson tested but incorrectly answered and needing review," "lesson complete (tested and answered correctly)" and the like. Moreover, a context sensitive menu can be provided to present the status data. The context sensitive menu can be generated by right-clicking the appropriate unit or section icon, using a pull down menu, or the like as would be apparent to one skilled in the relevant art(s).

In an embodiment of the present invention, the unit syllabuses as well as the online assistance information and lesson contents (i.e., script window 942) for each section, including supporting media (i.e., supporting media window 948) are stored in curriculum database 324a. Therefore, in an embodiment, curriculum manager 424 uses, for example, a Java application to receive user requests for lesson contents, online assistance and/or syllabuses, selects data packets containing the appropriate lesson content, online assistance or syllabus from curriculum database 324a, and routes the data packets to the requester.

In an embodiment of the present invention, supporting media are stored in curriculum database 324a and routed to student 720, as discussed above. In another embodiment, the supporting media can be stored and read directly from a memory unit, such as a CD-ROM drive, integrated with student workstations 304. In this embodiment, this dynamic and graphic media integrated into the lesson content would appear to come from curriculum manager 424, but would actually be delivered from, for example, the CD-ROM to provide fast access to the elements with a minimum of bandwidth.

Prior to processing a client's request for lesson or syllabus data, curriculum manager 424 determines whether the client has been authorized to receive the data transmissions. Using tutorial controller 416, curriculum manager 424, in an embodiment, exchanges communications with matriculation manager 420 to determine the client's authorization status, as discussed above. Only if the client has been authorized as determined by matriculation manager 420 would the client receive the lesson and/or syllabus transmissions. As such, curriculum manager 424 is configured to support interactive real time communications with client workstations over a network connection, such as the Internet.

In an embodiment, curriculum manager 424 can send exercise material to student 720 to support the lesson unit/sections. The exercises can be a separate section or unit located in the lesson syllabus. The exercises can also be prepared by the respective instructor 716 and routed to student 720. The exercise material is used to supplement the lesson content and provide hands-on training for media production. As such, the exercises can be developed to correspond to the content and complexity (i.e., beginning, intermediate and advance) of the individual lessons. For example, the exercise can be an assignment for student 720 to create a producer's rundown and broadcast instructions, or select pre-prepared broadcast instruction or prerecorded show segments, that can be used to program a media production system 100. If, for example, the student is currently viewing lesson sections related to video cameras, the assignment can request student 720 to place the appropriate camera icons 274–277 onto camera control lines 1008–1011 to create broadcast instructions. The assignment or exercises can also be designed to teach other functions and operations of media production system 100 discussed above. For instance, student 720 can be directed to program and/or execute a hot-key 212 that can be used to produce a show segment. Student 720 can also be requested to create other types of pre-production instructions, such as the order of show segments, transition effects, camera signals, BCEs, and the like.

Moreover, student 720 can be directed to execute broadcast instructions to produce and stream a live show directly from student workstations 308. Media production system 100 is configurable to stream live video, and/or record and store to a record/playback device (RPD) 128 a live video show, as described in the '161 application and the '735 application. Thus, tutorial system 300 permits video shows to be broadcast over computer network 316 either live or on-demand. In an embodiment, the entire show can be video streamed over the Internet for viewing by instructor 716 or other clients or authorized users of tutorial system 300.

As such, student workstations 308 are configured to send instructions to the media production system 100 and control a plurality of media production devices, as discussed above. To execute the broadcast instructions, in an embodiment, student 720 can route the commands directly to the media production system 100. Alternatively, in another embodiment, the commands can be routed to curriculum manager 424 before it is directed to the media production system 100. In this embodiment, curriculum manager 424 can evaluate the broadcast instructions for accuracy and provide real time feed back to the student. The feed back can include recommendations for creating a more efficient broadcast instructions. Similarly, the broadcast instructions or the video broadcast can be routed to instructor 716 for evaluation and feedback. For all exercises, the exercise material, and recommended answers for the exercise material, can be stored in curriculum database 324a and linked to the appropriate lesson section/unit.

D. Performance Manager

In addition to streaming lesson contents over network connection 316, tutorial management server 320 can also conduct quizzing and testing for the lesson sections/units, deliver test scores and status reports, and maintain a database of all student 720 and institution performance records. Referring to FIG. 4, tutorial management server 320 utilizes performance manager 428 to perform the examination functions. In an embodiment, performance manager 428 provides two types of examinations: section quizzes and unit tests. As discussed below, curriculum database 324a maintains a separate collection of quiz and test questions that are linked to each lesson section. Accordingly, each lesson unit would have a collection of quiz questions and collection of test questions. In an embodiment, each lesson section has a minimum of four test questions.

Section quizzes provide each student 720 with an opportunity to immediately self evaluate the student's mastery of the subject matter. Student 720 can take a section quiz at any time during a tutorial session by activating examination icon 916. Upon activation, performance manager 428 would verify the student's access privileges by communicating with matriculation manager 420 through tutorial controller 416. Next, performance manager 428 would communicate with curriculum database 324a to obtain and route a quiz question to the respective student workstation 304. In an embodiment, the quiz question is chosen from all prior visited lesson sections. As discussed above, the student's visited lesson sections are tracked and recorded in institution database 324b by curriculum manager 424. In an alternative embodiment, the quiz question can be chosen only from the current lesson section. In both embodiments, the question can be randomly chosen or selected from an ordered list.

Performance manager 428 maintains a log of the questions from section quizzes and unit tests that have been routed to each student 720. In an embodiment, the student's question log is stored with the records of student 720 in institution database 324b. If the quiz question is correctly answered, performance manager 428 would route instructions via, for example, a Java applet to create a graphical depiction, such as a dialog box, to congratulate the student. The student's question log would be updated to indicate that student 720 has correctly answered the question.

If the question is incorrectly answered, the related section topic is recorded in the student's study guide, as discussed in detail below. Additionally, the student's question log would be updated to indicate that student 720 did not correctly answer the question. In an embodiment, subsequent quiz questions would be selected and compared against the question log, and performance manager 428 would only send those questions that student 720 has not answered previously or correctly.

FIG. 12 illustrates an embodiment of GUI 1200 for displaying an exemplary quizzing session for one or more lesson sections on student workstations 304. As discuss, activation of examination icon 916 would temporarily suspend an active tutorial session and initiate the quizzing session. Performance manager 428 would send the quiz question to the respective student workstation 304 where the quiz would be displayed in script window 942. For example, script window 942 can provide the text for the quiz question and two or more answer choices. Student 702 would indicate a response by moving an input device, such as a mouse, to select the appropriate answer. Activating the send icon 1250 would cause the respective student workstation 304 to send the answer response to performance manager 428 for evaluation. Performance manager 428 compares the response to an answer key stored in curriculum database 324a and provides real time feedback to the respective student workstation 304.

In addition to the section quizzes, performance manager 428 provides unit tests to evaluate each student 720 and test the student's knowledge of the respective lesson unit. In an embodiment, student 720 would automatically receive a unit test after viewing all lessons in the current unit. This may occur when student 720 comes to the end of a lesson unit and activates next directional icon 924c after viewing the last lesson section. In another embodiment, student 720 can be prompted to indicate whether the student is ready to take the unit test after viewing all lessons in the current unit. In this embodiment, performance manager 428 can give student 720 the option of initiating a quizzing or testing session, or skipping or delaying the examination phase to view other lesson units, review the visited lessons or use the study guide feature, as discuss below. In another embodiment, student 702 can take a unit test at any time by activating unit test icon 1148 on syllabus GUI 1100, as shown in FIG. 11. In this embodiment, performance manager 428 can evaluate a student's proficiency in a particular area before student 720 views the lesson unit, and subsequently retest student 720 to measure the student's improvement.

To initiate a unit testing session, performance manager 428 would verify the student's access privileges by communicating with matriculation manager 420 through tutorial controller 416. Next, performance manager 428 would communicate with curriculum database 324a to obtain and route unit test questions to the respective student workstation 304. The test questions are selected from the test questions related to the respective lesson unit. The test questions can be randomly generated or selected from an ordered list. In an embodiment, the total number of test questions are determined by the number of sections in the respective unit. A typical unit test would include at least one question from each section.

FIG. 13 illustrates an embodiment of GUI 1300 for displaying an exemplary testing session for one or more lesson units on student workstations 304. As discussed, activation of next directional icon 924c or the activation of an testing icon, such as unit test icon 1148 as shown in FIG. 11, would initiate the testing session. Performance manager 428 would send the test questions to the respective student workstation 304 where the unit test would be displayed in script window 942. As discussed in reference to quiz GUI 1200, script window 942 can provide the text for each test question and two or more answer choices. Student 702 would indicate a response by moving an input device, such as a mouse, to select the appropriate answer. Activating the send icon 1350 would cause the respective student workstation 304 to send the answer response to performance manager 428 for evaluation.

In an embodiment, performance manager 428 compares the student responses against an answer key stored in curriculum database 324a. In this embodiment, a test report indicating the student's performance can be generated and routed to the respective student workstation 304 in real time. In an embodiment, student 720 can have the option of indicating whether the test report would be automatically sent to the assigned instructor 716. The student's performance on all questions (i.e., tests and quizzes) is stored in the student's records in institution database 324b. A cumulative performance report can be generated at any time from this data. In an embodiment, when exit icon 934 is activated to terminate a tutorial session, as discussed above, the student's current cumulative performance statistics can be routed to the respective student workstation 304. For example, the respective student workstation 304 can display a message saying, "You have 10 days to complete Course 101. You have visited 95% of the Units. There are 5 lessons listed in your Study Guide as tested/quizzed incorrectly. You have completed 90% of the Course." The student's cumulative performance statistics can also be generated when requested by an authorized client. For example, instructor 716 and institution administrators can request performance statistics for a single student 720 or an entire class or institution.

As discussed in reference to the quizzing sessions, a question log can also be generated to record the student's performance on the unit test. Incorrectly answered questions can be designated to be resent to student 720 during future testing sessions. Additionally, the related sections for the incorrectly answered questions can be recorded in the student's study guide. Performance manager 428 also permits student 720 to save a unit test and/or retake the unit test at a future date.

E. Study Guide Manager

Another tutorial application manager is study guide manager 432. Study guide manager 432 serves as a review tool. In an embodiment, study guide manager 432 maintains a study guide table for each student 720. The study guide table provides a compilation of lesson topics (i.e., lesson units and sections) for student 720 to review. The table can be stored in institution database 324b, where it can be linked to the student's records, as discussed below in more detail.

The study guide table can be generated manually by a client (i.e., student 720 or instructor 716) or automatically by study guide manager 432. In other words, in an embodiment, student 720 or instructor 716 can unilaterally select lesson sections that the client believes require further review and add the lesson topics to the study guide table for the respective student(s) 720. In another embodiment, performance manager 428 tracks and monitors the overall performance of each student 720, as discussed above. In this embodiment, tutorial controller 416 coordinates the exchange of communications between performance manager 428 and study guide manager 432 during quizzing or testing sessions. If a question is incorrectly answered, the related section topic can be automatically recorded in the student's study guide table. Alternatively, in this embodiment, performance manager 428 can determine the student's cumulative statistical performance for each lesson section, and record only the topics having a low proficiency score. For example, the study guide table can include only those sections where the cumulative performance is below 80% or some other percentage selected by a client (i.e., instructor 716 or student 720) or set by study manager 432.

Student 720 can access the study guide table from the respective student workstation 304. FIG. 14 illustrates an embodiment of GUI 1400 for displaying an exemplary review page generated by study guide manager 432. The activation of review icon 920 would temporarily suspend an active tutorial session and request study guide manager 432 to send instructions to the respective student workstation 304 to create the review page. For example, script window 942 can provide data summarizing the student's cumulative performance. For example, script window 942 can provide reminders to student 720, such as "You have 15 days to complete 60% of the Unit 02. You have yet to visit 30% of these lessons, you have visited 42% but not been quizzed on 24%, you have successfully passed 30% of the quizzes."

The contents from the study guide table can be presented in region 1404. In an embodiment, as shown in FIG. 14, region 1404 can list the unit, section and subsection for each topic referenced in the study guide table. A hyperlink can be provided to identify and access each section or subsection in region 1404. For example, as shown in FIG. 14, a hyperlink provides access to the subsections entitled "Long Shots" and "Dolly" in Unit 2. Student 720 can review the section or subsection by activating the hyperlink by, for example, moving a mouse to click on the hyperlink. In response, the respective student workstation 304 would send a request to curriculum manager 424 for the designated lesson section or subsection, as discussed above.

F. Messaging Manager

Tutorial management server 320 also includes messaging manager 436. Messaging manager 436 permits each client to send messages to one or more other clients. For example, one student 720 can send a personal email to another student 720 or instructor 716. Likewise, instructor 716 can send email messages to all students 720, or to one or more designated students 720, in the course taught by instructor 716. Furthermore, student 720 or instructor 716 can post a bulletin message that can be accessed and read by all authorized clients.

In an embodiment, an announcement board can be established for each class taught by instructor 716. Instructor 716 can use the announcement board to amplify and expand course content and respond to specific questions from student 720. Upon request, messaging manager 436 sends a form to the respective instructor workstation 308 for instructor 716 to post announcements and responses. When new announcements are posted, messaging manager 436 sends a notification or reminder message to each student 720 to check the announcement board. The notification can be sent when student 720 initializes a tutorial session or in real time as instructor 716 posts the announcements and responses.

Student 720 can access the announcements board from the respective student workstation 304. FIG. 17 illustrates an embodiment of GUI 1700 for displaying an exemplary announcements page generated from the announcement board by messaging manager 436. The activation of announcement icon 908 would temporarily suspend an active tutorial session and request messaging manager 436 to send instructions to the respective student workstation 304 to create the announcements page. For example, script window 942 displays the announcements and responses posted by instructor 716. Student 720 can send questions and comments to instructor 716 by entering the data in reply window 1720. Activating send icon 1750 would cause the respective student workstation 304 to send the questions and comments to messaging manager 436. Messaging manager 436 would route the reply to instructor 716 if the transaction is authorized by matriculation manager 420.

To respond to a reply from student 720, instructor 716 can post the student's reply, with or without the student's name, and the instructor's response on the announcement board. The reply can be posted as originally drafted or instructor 716 can edit or paraphrase the reply. Messaging manager 436 would route the data to script window 942, as discussed above. Alternatively, instructor 716 can send student 720 a private email in response to the student's reply, as appropriate. Therefore, instructor 716 is able to edit, police and monitor the announcement board for each course.

Referring back to FIG. 4, in an embodiment, all requests to post or send a message are routed to messaging manager 436 via tutorial controller 416. Tutorial controller 416 supports communications with matriculation manager 420 to enable messaging manager 436 to verify whether a client is authorize to send or post a message. Messaging manager 436 also supports client requests to obtain other clients' email addresses. Accordingly, messaging manager 436 is able to obtain client addresses from the client profiles stored in institution database 324*b*.

G. Tutorial Database

As discussed above, tutorial management server 320 exchanges communications with tutorial database 324. Referring again to FIG. 4, all communications with tutorial database 324 (shown as curriculum database 324*a* and institution database 324*b*) are coordinated through database controller 440.

The communications include instructions to copy, read and/or write to the database records. As such, database controller 440 serves as a window to tutorial database 324 and queries tutorial database 324 as requested by the tutorial application managers (i.e., 420, 424, 428, 432 and 436).

Tutorial database 324 comprises a collection of integrated records used to support tutorial management server 320. In an embodiment, tutorial database 324 includes a relational database management system (not shown) that controls the storing, retrieving and updating of data and metadata in the records in tutorial database 324. The database management system also controls data integration, enforces integrity rules and constraints, and enforces security constraints. Referring again to FIG. 4, the database management system receives communications from database controller 440 and manipulates tutorial database 324 to retrieve, store or update the records, as appropriate.

FIG. 4 illustrates one representative embodiment of tutorial database 324. In this embodiment, tutorial database 324 comprises curriculum database 324*a* and institution database 324*b*. The records in curriculum database 324*a* includes data and metadata used to support curriculum manager 424. For example, curriculum database 324*a* can store four hundred or more lesson units that curriculum manager 424 can route to student workstations 304. As discussed in reference to FIG. 9, curriculum database 324*a* contains records for storing the text for the lesson content routed to script window 942. Curriculum database 324*a*, in an embodiment, contains records for the supporting media routed to supporting media window 948. The database records also contain online assistance information that can be obtained by activating help icon 930. As discussed above, the records of curriculum database 324*a* includes a collection of quiz and test questions that are linked to each lesson section. In an embodiment, each lesson section has a minimum of four test questions.

As shown in FIG. 4, tutorial database 324 also includes institution database 324*b*. Institution database 324*b* contains records pertaining to each client (i.e., student 720, instructor 716 and institution) that has been authorized to utilize tutorial management server 320. As discussed, matriculation manager 420 generates a profile for each client and stores the profile in institution database 324*b*. The profile includes a complete record of the client's demographic data, such as name, geographic address, email address, age, gender, educational background, and the like, as would be apparent to one skilled in the relevant art(s). The client profile can also include data about the respective client workstations, such as model, manufacture, serial number, operating system, browser software, word processing programs, graphics software, memory capacity, microprocessor speed, and the like, as would be apparent to one skilled in the relevant art(s).

For each student 720, the records in institution database 324*b* include data that monitors and tracks the student's progress with the lesson units. This data includes the lesson sections that have been viewed, test and quiz questions that have been answered, the student's performance on the questions, and the like.

FIG. 5 illustrates an embodiment of a relational diagram of the objects stored in tutorial database 324. As shown, institution object 510 contains all records pertaining to each registered institution. Similarly curriculum object 514 represents the lesson contents and contains the records pertaining to curriculum database 324*a*. Institution object 510 has a many-to-many relationship to curriculum object 514. Accordingly, each registered institution can sponsor, and thus, have related records for, a plurality of lesson courses. Also, as shown in FIG. 5, curriculum object 514 has a many-to-many relationship with both instructor object 528 and student object 532. Instructor object 528 and student object 532 represent the database records pertaining to each instructor 716 and student 720. Therefore, the records in tutorial database 324 supports each student 720 taking multiple courses, and each course, stored in curriculum database 324*a*, having multiple students 720 enrolled therein.

An embodiment of a relational diagram for the objects in curriculum database 324*a* is illustrated in FIG. 6. As discussed, curriculum object 514 represents the lessons contents or courses stored in curriculum database 324*a*. Each lesson has one or more syllabuses represented by syllabus object 610. In this embodiment, syllabus object 610 has a one-to-many relationship with instructors curriculum object 614 and lesson units object 618. Instructors curriculum object 614 represents the records for an instructor's curriculum guide. The curriculum guide can be used to provide online instructions to instructor 716 to assist in lesson planning, teaching media production techniques and the like. The curriculum guide is updated periodically such that instructor 716 can be informed of the latest media production technological changes in real time. In another embodiment, the lesson units and corresponding curriculum guide sections can be located or linked with more than one syllabus, thus supporting a many-to-many relationship.

Lesson units object 618 represents the records used to route data and metadata for each lesson unit. In this embodiment, lesson units object 618 has a one-to-many relationship with both lesson sections object 622 and lesson tests objects 626. Lesson sections object 622 represents the records for the lesson sections, and lesson test object 626 represents the records for the questions and answers for the tests compiled for each lesson section/unit. Curriculum database 324a can also be configured to support many-to-many relationships among lesson units object 618, lesson sections object 622 and lesson tests objects 626.

Lesson sections object 622 are linked to exercises object 634 and quizzes object 638. Quizzes object 638 represent the records for the quiz questions and answers compiled for each lesson section. Exercise object 634 represents the exercise materials used to supplement the lesson section/units and provide hands-on training for student 720. For example, in an embodiment, a lesson section may include instructions to create a rundown sheet or broadcast instructions that can be implemented by media production system 100, as discussed above. The quiz and exercises can be unique to each lesson section, or the lesson sections can have quizzes and/or exercises in common. Accordingly, the database designs depicted in FIGS. 5 and 6 are representative embodiments of the present invention. It would be apparent to one skilled in the relevant art(s) that other designs can be easily used to structure the relationship among the various components without changing the scope of the invention.

V. Software and Hardware Embodiments

The present invention (i.e., media production systems 100, tutorial system 300, tutorial management server 320, tutorial database 324, or any part thereof) can be implemented using hardware, software or a combination thereof and can be implemented in one or more computer systems or other processing systems. In fact, in an embodiment, the invention is directed toward one or more computer systems capable of carrying out the functionality described herein.

Figure 8:
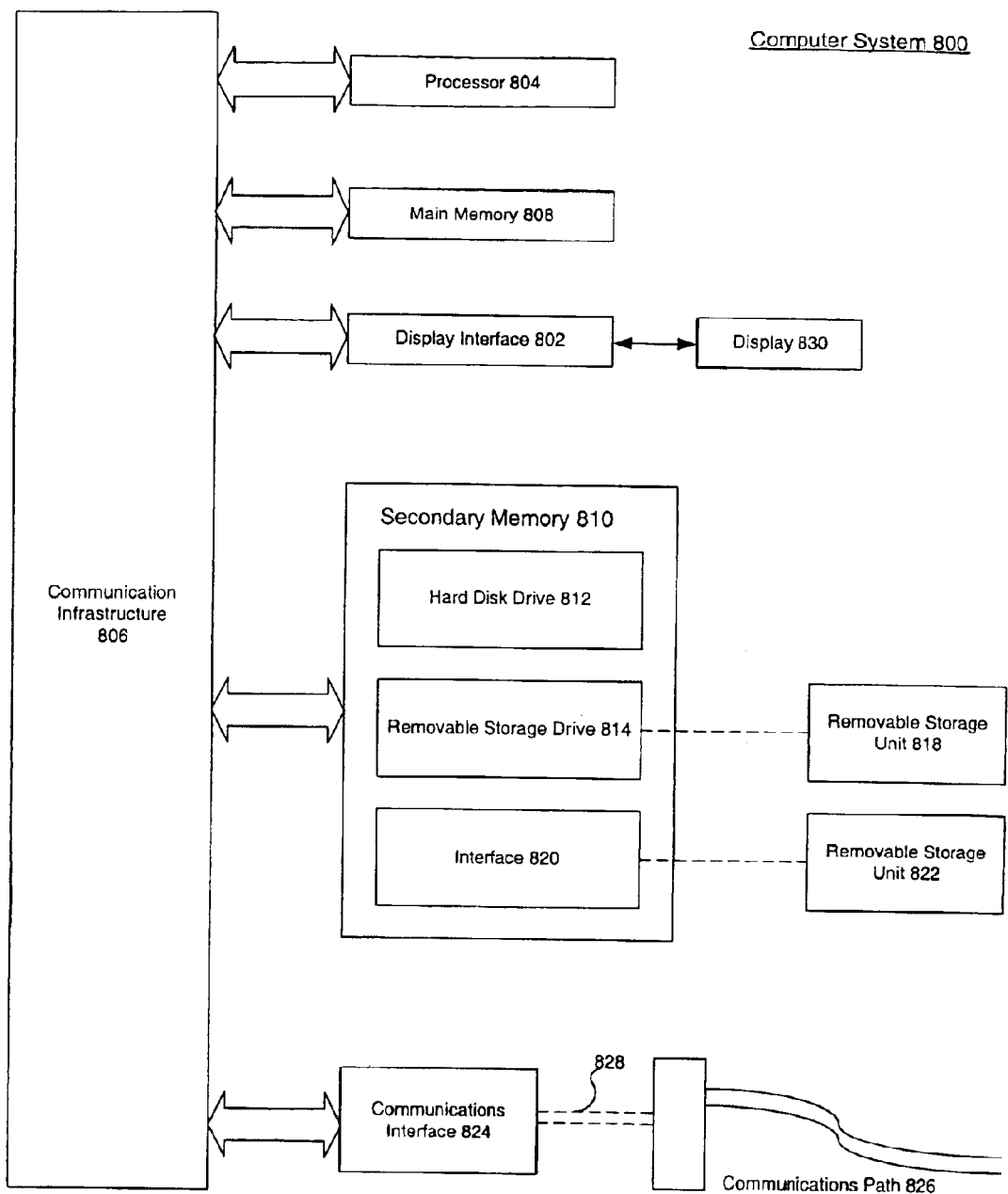
FIG. 8 is a block diagram of an example computer system useful for implementing the present invention.

Referring to FIG. 8, an example computer system 800 useful in implementing the present invention is shown. The computer system 800 includes one or more processors, such as processor 804. The processor 804 is connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to removable storage drive 814. As will be appreciated, the removable storage unit 818 includes a computer usable storage medium having stored therein computer software and/or data.

In alternative embodiments, secondary memory 810 can include other similar means for allowing computer programs or other instructions to be loaded into computer system 800. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Examples of communications interface 824 can include a modem, a network interface (such as an Ethernet card), a communications port, a PCMCIA slot and card, etc. Software and data transferred via communications interface 824 are in the form of signals 828 which can be electronic, electromagnetic, optical or other signals capable of being received by communications interface 824. These signals 828 are provided to communications interface 824 via a communications path (i.e., channel) 826. This channel 826 carries signals 828 and can be implemented using wire or cable, fiber optics, a phone line, a cellular phone link, an RF link and other communications channels.

In this document, the terms "computer program medium" and "computer usable medium" are used to generally refer to media such as removable storage drive 814, a hard disk installed in hard disk drive 812, and signals 828. These computer program products are means for providing software to computer system 800. The invention is directed to such computer program products.

Computer programs (also called computer control logic) are stored in main memory 808 and/or secondary memory 810. Computer programs can also be received via communications interface 824. Such computer programs, when executed, enable the computer system 800 to perform the features of the present invention as discussed herein. In particular, the computer programs, when executed, enable the processor 804 to perform the features of the present invention. Accordingly, such computer programs represent controllers of the computer system 800.

In an embodiment where the invention is implemented using software, the software can be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above described exemplary embodiments, but should be defined only in accordance with the following claims and their equivalents.

What is claimed is:

1. A system for training at least one student over a communication channel, comprising:

tutorial processing means for providing a lesson to a client associated with a student to guide the student in the preparation of a sequence of commands to control a plurality of media production devices to produce at least one live or live-to-tape show segment, wherein at least one of said tutorial processing means and said client includes means for transmitting a command to initiate execution of said sequence of commands;

an automation control system for receiving and executing the sequence of commands to control the plurality of media production devices to produce the live or live-to-tape show segment; and communications means for supporting bidirectional communication over the communication channel among said automation control system, said tutorial processing means, and said client.

2. A system of claim 1, wherein said tutorial processing means further comprises:

interrogation means for sending a test to said client for use by the student, wherein said client includes an input interface for permitting a student to interact with said test;

evaluation means for determining the perfonnance of said student on said test; and guidance means for sending a study guide to said client for use by the student, the study guide based on said performance on said test.

3. A system of claim 1, wherein said communications means further comprises means for supporting said bidirectional communication over the Internet.

4. A method for training one or more students over a communications channel, comprising the steps of:

sending a lesson from a tutorial processing means over the communications channel to a client associated with a student, wherein said lesson includes an assignment to produce commands to operate at least one of a plurality of media production devices to produce a live or live-to-tape show segment;

receiving data, from said student, at said tutorial processing means in response to said lesson;

processing said data according to programmed instructions; and sending feedback to said student.

5. A method of claim 4, wherein said assignment includes directions to prepare a production script and define a sequence of production commands that, when executed, sends control commands to automatically operate said at least one of a plurality of media production devices to produce said live or live-to-tape show segment.

6. A method of claim 5, wherein said sequence includes instructions to perform at least one of the following tasks: transmit media segments, assign transition effects, send text to a teleprompting means, or control camera shots.

7. A method of claim 4, wherein said lesson comprises text, video graphics and animation.

8. A method of claim 4, wherein said processing step further comprises the step of sending a study guide based on said data to said student.

9. A method of claim 4, further comprising the step of sending at least one test to said student.

10. A method of claim 9, wherein said processing step further comprises the step of determining the performance of said student on said lesson quiz or said lesson test.

11. A method of claim 10, wherein said processing step further comprises the step of sending a study guide based on said performance on said test.

12. A method of claim 4, wherein said communications channel comprises the Internet.

13. A method for producing content, comprising the steps of:

(a) distributing to at least one client associated with a student lesson to guide the student in preparing a sequence of production commands for controlling the operation of a plurality of media production devices to produce at least one live or live-to-tape show segment;

(b) receiving via the client the sequence of production commands to control a plurality of media production devices to produce the live or live-to-tape show segment responsive to said lesson; and (c) authorizing execution of said sequence of production commands-to produce said live or live-to-tape show segment.

14. The method of claim 13, wherein step (c) further comprises the step of:

evaluating said sequence, wherein said authorizing occurs in response to a favorable evaluation.

15. The method of claim 14, wherein step (c) further comprises the step of:

presenting an evaluation report to enable a user to correct or refine said sequence prior to said authorizing.

16. A method for interactive training, comprising the steps of:

(a) providing access to a lesson that presents instructions regarding how to prepare a sequence of commands to control a plurality of media production devices to produce at least one live or live-to-tape show segment;

(b) receiving a sequence of production commands to control the plurality of media production devices to produce the live or live-to-tape show segment responsive to said lesson; and (c) executing said sequence of production commands to produce said live or live-to-tape show segment.

17. The method of claim 16, wherein step (a) comprises the step of:

accessing at least a part of said lesson from a local storage medium.

18. The method of claim 16, wherein step (a) comprises the step of:

accessing said at least part of a lesson through a wireless interface with a remote medium.

19. The method of claim 16, further comprising the step of:
- (d) including commands in said sequence to allow distribution of said live or live-to-tape show show segment over the Internet.

20. The method of claim 16, further comprising the step of:
- (d) including commands in said sequence to allow distribution of said live or live-to-tape show segment to one or more destinations.

21. A method for managing training sessions, comprising the steps of:
- (a) authorizing a user to access a lesson providing instructions regarding how to prepare a sequence of commands to control a plurality of media production devices, including at least one of a video switcher, digital video effects device, teleprompting system, and studio lighting, to produce at least one live or live-to-tape show segment;
- (b) distributing said lesson to a device associated with said user;
- (c) receiving from the user said sequence of production commands to control the plurality of media production devices to produce the live or live-to-tape show segment responsive to said lesson; and
- (d) authorizing execution of said sequence to produce said live or live-to-tape show segment.

22. The method of claim 21, wherein step (a) further comprises the step of:
receiving a payment for said lesson.

23. The method of claim 21, wherein step (a) further comprises the step of:
accepting an electronic payment for said lesson.

24. The method of claim 21, wherein step (a) further comprises the step of:
evaluating user performance on past lessons, wherein said authorizing occurs in response to a favorable evaluation.

25. The method of claim 21, wherein step (a) further comprises the step of:
authorizing access in response to determining said user is approved to access said lesson.

26. The method of claim 21, wherein step (a) further comprises the step of:
indicating placement of said user within a plurality of lessons.

27. The method of claim 21, wherein step (a) further comprises the step of:
authenticating the user to implement said authorizing.

28. A method for providing training, comprising the steps of:
- (a) distributing to a user a lesson providing instructions regarding how to prepare a sequence of commands to control a plurality of media production devices, to produce at least one live or live-to-tape show segment;
- (b) receiving from the user said sequence of production commands to control the plurality of media production devices to produce said live or live-to-tape show segment responsive to said lesson;
- (c) authorizing execution of said sequence to produce said live or live-to-tape show segment; and
- (d) allowing access to a messaging center during training.

29. The method of claim 28, wherein step (d) further comprises the step of:
sending an announcement to at least one user.

30. The method of claim 28, wherein step (d) further comprises the step of:
alerting said at least one user to access said messaging center.

31. The method of claim 28, wherein step (d) further comprises the step of:
posting a message from said at least one user for access by at least one other user.

32. The method of claim 28, wherein step (d) comprises the step of:
authenticating said at least one user.

33. A system, comprising:
- an instructor interface for enabling lesson planning;
- a client for providing access to at least one lesson, offering instructions regarding how to prepare a sequence of commands to control a plurality of media production devices, including at least one of a video switcher, digital video effects device, teleprompting system, and studio lighting, to produce at least one live or live-to-tape show segment;
- a curriculum controller for distributing the at one least lesson to a user to prompt the user to prepare the sequence of commands; and
- an automation control system for receiving the sequence of commands prepared by the user responsive to the at least one lesson and for executing said sequence to produce said live or live-to-tape show segment.

34. The system of claim 33, further comprising:
a communicator disposed at said client, wherein said communicator enables at least one of a voice or video transmission to at least one of a second client or said instructor interface.

35. The system of claim 33, wherein said instructor interface includes means, for blocking user access to said at least a a portion of said at least one lesson.

36. A system, comprising:
- a client for providing access to at least one lesson offering instructions regarding how to prepare a sequence of commands to control a plurality of media production devices, to produce at least one live or live-to-tape show segment;
- a matriculation controller for registering a user to access said at least one lesson; and
- an automation control system for receiving said sequence of commands prepared by the user responsive to said at least one lesson and for executing said sequence to produce said live or live-to-tape show segment.

37. The system of claim 36, wherein said matriculation controller includes security means for governing access to said at least one lesson.

38. The system of claim 36, wherein said matriculation controller includes payment means for verifying payment for accessing said at least one lesson.

39. The system of claim 36, wherein said matriculation controller includes collection means for invoicing a user for accessing said at least one lesson.

40. A production training system, comprising:
- an instructor interface for enabling lesson planning;
- a curriculum controller for distributing at least one lesson that includes instructions for preparing a sequence of commands to control a plurality of media production devices to produce at least one live or live-to-tape show segment in response to executing said lesson; and
- an automation control system for receiving said sequence of commands prepared by the user responsive to said at least one lesson and for executing said sequence to produce said live or live-to-tape show segment.

41. A system, comprising:

a curriculum controller for distributing at least one lesson, that includes instructions for preparing a sequence of commands to control a plurality of media production devices to produce at least one live or live-to-tape show segment in response to executing said lesson; and an automation control system for receiving said sequence of commands prepared by the user responsive to said at least one lesson and for executing said sequence to produce said live or live-to-tape show segment.

42. A system, comprising:

a client for accessing at least one lesson;

a curriculum controller for distributing said at least one lesson that includes instructions for preparing a sequence of commands to control a plurality of media production devices to produce at least one live or live-to-tape show segment in response to accessing said lesson, wherein said production devices include at least one of a video switcher, digital video effects device, teleprompting system, and studio lighting; and an automation control system for receiving said sequence of commands prepared by the user responsive to the lesson and for executing said sequence to produce said live or live-to-tape show segment.

43. A system, comprising:

a plurality of training groups, wherein each training group includes a plurality of clients each accessing at least one lesson wherein each training group communicates with an instructor interface for enabling lesson planning;

curriculum controller for distributing said at least one lesson that includes instructions for preparing a sequence of commands to control a plurality of media production devices to produce at least one live or live-to-tape show segment in response to accessing a lesson; and automation control system for receiving said sequence of commands prepared by the user responsive to said at least one lesson and for executing said sequence to produce said live or live-to-tape show segment.

* * * * *